US012276858B2

(12) United States Patent
Marcouiller et al.

(10) Patent No.: US 12,276,858 B2
(45) **Date of Patent: *Apr. 15, 2025**

(54) FIBER OPTIC CIRCUIT AND PREPARATION METHOD

(71) Applicant: COMMSCOPE TECHNOLOGIES LLC, Hickory, NC (US)

(72) Inventors: Thomas Marcouiller, Shakopee, MN (US); Paula Lockhart, New Prague, MN (US); Wouter Vranken, Nieuwrode (BE); Koen Vuerinckx, Holsbeek (BE); Laurens Izaäk Van Wuijckhuijse, Eden Prairie, MN (US)

(73) Assignee: CommScope Technologies LLC, Claremont, NC (US)

(*) Notice: Subject to any disclaimer, the term of this patent is extended or adjusted under 35 U.S.C. 154(b) by 39 days.

This patent is subject to a terminal disclaimer.

(21) Appl. No.: 18/185,795

(22) Filed: Mar. 17, 2023

(65) Prior Publication Data

US 2023/0288657 A1 Sep. 14, 2023

Related U.S. Application Data

(63) Continuation of application No. 17/855,153, filed on Jun. 30, 2022, now Pat. No. 11,609,400, which is a (Continued)

(51) Int. Cl.
*G02B 6/44* (2006.01)
*G02B 6/36* (2006.01)

(52) U.S. Cl.
CPC ......... *G02B 6/4471* (2013.01); *G02B 6/3652* (2013.01); *G02B 6/3684* (2013.01); *G02B 6/4403* (2013.01); *G02B 6/448* (2013.01)

(58) Field of Classification Search
CPC ................ G02B 6/4281; G02B 6/4453; G02B 6/3608
See application file for complete search history.

(56) References Cited

U.S. PATENT DOCUMENTS 3,330,105 A 7/1967 Weber
4,359,262 A 11/1982 Dolan
(Continued)

FOREIGN PATENT DOCUMENTS

AU 40995/85 4/1985
AU 55314/86 3/1986
(Continued)

OTHER PUBLICATIONS http://www.youtube.com/watch?v=dNLFeCsa69E ; LK Flexible film Screen Protector Installation Video; May 8, 2017 (Year: 2017).*
(Continued)

*Primary Examiner* — Eric Wong
(74) *Attorney, Agent, or Firm* — Merchant & Gould P.C.

(57) ABSTRACT

A method of preparing a preformed fiber optic circuit for later termination to at least one fiber optic connector includes providing a substrate for supporting a plurality of optical fibers, the substrate including at least one layer of flexible foil, wherein the flexible foil may be formed from polyethylene terephthalate (PET) according to one example and peeling a layer including at least the optical fibers from the at least one layer of flexible foil.

6 Claims, 20 Drawing Sheets

62
62
64
64
64
CONEC
FOIL
68

Related U.S. Application Data continuation of application No. 16/753,268, filed as application No. PCT/US2018/053935 on Oct. 2, 2018, now Pat. No. 11,409,068.

(60) Provisional application No. 62/566,906, filed on Oct. 2, 2017.

(56) References Cited

U.S. PATENT DOCUMENTS 4,502,754 A 3/1985 Kawa
4,585,303 A 4/1986 Pinsard et al.
4,595,255 A 6/1986 Bhatt et al.
4,630,886 A 12/1986 Lauriello et al.
4,697,874 A 10/1987 Nozick
4,699,455 A 10/1987 Erbe et al.
4,708,430 A 11/1987 Donaldson et al.
4,717,231 A 1/1988 Dewez et al.
4,725,120 A 2/1988 Gnat
4,733,936 A 3/1988 Mikolaicyk et al.
4,736,100 A 4/1988 Vastagh
4,747,020 A 5/1988 Brickley et al.
4,765,710 A 8/1988 Burmeister et al.
4,792,203 A 12/1988 Nelson et al.
4,824,196 A 4/1989 Bylander
4,840,449 A 6/1989 Ghandeharizadeh
4,861,134 A 8/1989 Alameel et al.
4,900,123 A 2/1990 Barlow et al.
4,948,220 A 8/1990 Violo et al.
4,971,421 A 11/1990 Ori
4,986,762 A 1/1991 Keith
4,989,946 A 2/1991 Williams et al.
4,995,688 A 2/1991 Anton et al.
5,011,257 A 4/1991 Wettengel et al.
5,023,646 A 6/1991 Ishida et al.
5,058,983 A 10/1991 Corke et al.
5,067,784 A 11/1991 Debortoli et al.
5,071,211 A 12/1991 Debortoli et al.
5,073,042 A 12/1991 Mulholland et al.
5,076,688 A 12/1991 Bowen et al.
5,100,221 A 3/1992 Carney et al.
5,107,627 A 4/1992 Mock, Jr. et al.
5,109,447 A 4/1992 Chan
5,127,082 A 6/1992 Below et al.
5,129,021 A 7/1992 Mortimore et al.
5,129,030 A 7/1992 Petrunia
5,138,688 A 8/1992 Debortoli
5,142,598 A 8/1992 Tabone
5,142,606 A 8/1992 Carney et al.
5,155,785 A 10/1992 Holland et al.
5,160,188 A 11/1992 Rorke et al.
5,167,001 A 11/1992 Debortoli et al.
5,179,618 A 1/1993 Anton
5,204,925 A 4/1993 Bonanni et al.
5,208,885 A 5/1993 Dragone et al.
5,212,761 A 5/1993 Petrunia
5,214,735 A 5/1993 Henneberger et al.
5,231,687 A 7/1993 Handley
5,233,674 A 8/1993 Vladic
5,235,665 A 8/1993 Marchesi et al.
5,259,051 A 11/1993 Burack et al.
5,274,729 A 12/1993 King et al.
5,274,731 A 12/1993 White
5,287,425 A 2/1994 Chang
5,289,558 A 2/1994 Teichler et al.
5,292,390 A 3/1994 Burack et al.
5,317,663 A 5/1994 Beard et al.
5,318,259 A 6/1994 Fussler
5,323,478 A 6/1994 Milanowski et al.
5,327,513 A 7/1994 Nguyen et al.
5,333,221 A 7/1994 Briggs et al.
5,333,222 A 7/1994 Belenkiy et al.
5,335,349 A 8/1994 Kutsch et al.
5,353,367 A 10/1994 Czosnowsk et al.
5,359,688 A 10/1994 Underwood
5,363,440 A 11/1994 Daoud
5,363,465 A 11/1994 Korkowski et al.
5,363,467 A 11/1994 Keith
5,367,598 A 11/1994 Devenish, III et al.
5,402,515 A 3/1995 Vidacovich et al.
5,408,557 A 4/1995 Hsu
RE34,955 E 5/1995 Anton et al.
5,412,751 A 5/1995 Siemon et al.
5,420,958 A 5/1995 Henson et al.
5,430,823 A 7/1995 Dupont et al.
5,432,875 A 7/1995 Korkowski et al.
5,438,641 A 8/1995 Malacarne
5,442,726 A 8/1995 Howard et al.
5,448,015 A 9/1995 Jamet et al.
5,453,827 A 9/1995 Lee
5,461,690 A 10/1995 Lampert
5,469,526 A 11/1995 Rawlings
5,475,215 A 12/1995 Hsu
5,488,682 A 1/1996 Sauter et al.
5,490,229 A 2/1996 Ghandeharizadeh et al.
5,497,444 A 3/1996 Wheeler
5,509,096 A 4/1996 Easley
5,511,144 A 4/1996 Hawkins et al.
5,521,992 A 5/1996 Chun et al.
5,530,783 A 6/1996 Belopolsky et al.
5,542,015 A 7/1996 Hultermans
5,548,678 A 8/1996 Frost et al.
5,570,450 A 10/1996 Fernandez et al.
5,588,076 A 12/1996 Peacock et al.
5,613,030 A 3/1997 Hoffer et al.
5,636,138 A 6/1997 Gilbert et al.
5,636,310 A 6/1997 Walles
5,647,043 A 7/1997 Anderson et al.
5,655,044 A 8/1997 Finzel et al.
5,664,037 A 9/1997 Weidman
5,682,452 A 10/1997 Takahashi
5,687,266 A 11/1997 Leyssens et al.
5,689,604 A 11/1997 Janus et al.
5,708,751 A 1/1998 Mattei
5,708,753 A 1/1998 Frigo et al.
5,712,942 A 1/1998 Jennings et al.
5,715,348 A 2/1998 Falkenberg et al.
5,717,810 A 2/1998 Wheeler
5,727,097 A 3/1998 Lee et al.
5,734,776 A 3/1998 Puetz
5,734,777 A 3/1998 Merriken et al.
5,742,480 A 4/1998 Sawada et al.
5,754,720 A 5/1998 Quinn et al.
5,758,002 A 5/1998 Walters
5,758,003 A 5/1998 Wheeler et al.
5,764,839 A 6/1998 Igl et al.
5,764,844 A 6/1998 Mendes
5,774,245 A 6/1998 Baker
5,774,612 A 6/1998 Belenkiy et al.
5,781,686 A 7/1998 Robinson et al.
5,784,515 A 7/1998 Tamaru et al.
5,823,646 A 10/1998 Arizpe et al.
5,825,955 A 10/1998 Ernst et al.
5,841,917 A 11/1998 Jungerman et al.
5,870,519 A 2/1999 Jenkins et al.
5,878,179 A 3/1999 Schricker
5,881,194 A 3/1999 Duecker
5,883,995 A 3/1999 Lu
5,887,095 A 3/1999 Nagase et al.
5,889,910 A 3/1999 Igl et al.
5,898,811 A 4/1999 DiGiovanni et al.
5,903,698 A 5/1999 Poremba et al.
5,905,829 A 5/1999 Maenishi et al.
5,909,526 A 6/1999 Roth et al.
5,917,976 A 6/1999 Yamaguchi
5,917,980 A 6/1999 Yoshimura et al.
5,930,425 A 7/1999 Abel et al.
5,943,461 A 8/1999 Shahid
5,945,633 A 8/1999 Ott et al.
5,956,444 A 9/1999 Duda et al.
5,966,492 A 10/1999 Bechamps et al.
5,969,294 A 10/1999 Eberle et al.
5,970,196 A 10/1999 Greveling et al.
5,971,626 A 10/1999 Knodell et al.

(56) References Cited

U.S. PATENT DOCUMENTS 5,974,214 A 10/1999 Shacklette et al.
5,975,769 A 11/1999 Larson et al.
5,981,064 A 11/1999 Burack et al.
5,987,203 A 11/1999 Abel et al.
6,005,991 A 12/1999 Knasel
6,012,852 A 1/2000 Kadar-Kallen et al.
6,022,150 A 2/2000 Erdman et al.
6,027,252 A 2/2000 Erdman et al.
6,041,155 A 3/2000 Anderson et al.
6,044,193 A 3/2000 Szentesi et al.
6,061,492 A 5/2000 Strause et al.
6,076,975 A 6/2000 Roth
6,079,881 A 6/2000 Roth
6,097,872 A 8/2000 Kusuda et al.
6,149,315 A 11/2000 Stephenson
6,157,766 A 12/2000 Laniepce et al.
6,160,946 A 12/2000 Thompson et al.
6,167,183 A 12/2000 Swain
6,181,845 B1 1/2001 Horsthuis et al.
6,185,348 B1 2/2001 Shahid
6,188,687 B1 2/2001 Mussman et al.
6,188,825 B1 2/2001 Bandy et al.
6,205,278 B1 3/2001 Sjolinder
6,208,779 B1 3/2001 Rowlette, Sr. et al.
6,208,796 B1 3/2001 Williams Vigliaturo
6,215,938 B1 4/2001 Reitmeier et al.
6,222,976 B1 4/2001 Shahid
6,224,269 B1 5/2001 Engstrand et al.
6,226,431 B1 5/2001 Brown et al.
6,227,717 B1 5/2001 Ott et al.
6,229,933 B1 5/2001 Curzio et al.
6,229,942 B1 5/2001 Engberg et al.
6,234,683 B1 5/2001 Waldron et al.
6,236,795 B1 5/2001 Rodgers
6,240,229 B1 5/2001 Roth
6,256,443 B1 7/2001 Uruno et al.
6,259,844 B1 7/2001 Logan et al.
6,269,214 B1 7/2001 Naudin et al.
6,271,484 B1 8/2001 Tokutsu
6,278,829 B1 8/2001 BuAbbud et al.
6,301,413 B1 10/2001 Bringuier
6,304,690 B1 10/2001 Day
6,317,533 B1 11/2001 Slater et al.
RE37,489 E 1/2002 Anton et al.
6,338,975 B1 1/2002 Yoshimura et al.
6,347,888 B1 2/2002 Puetz
6,351,590 B1 2/2002 Shahid
6,352,374 B1 3/2002 Selfridge et al.
6,356,690 B1 3/2002 McAlpine et al.
6,356,697 B1 3/2002 Braga et al.
6,360,050 B1 3/2002 Moua et al.
6,363,200 B1 3/2002 Thompson et al.
6,377,738 B1 4/2002 Anderson et al.
6,385,381 B1 5/2002 Janus et al.
6,411,767 B1 6/2002 Burrous et al.
6,419,399 B1 7/2002 Loder et al.
6,424,781 B1 7/2002 Puetz et al.
6,425,694 B1 7/2002 Szilagyi et al.
6,431,762 B1 8/2002 Taira et al.
6,434,313 B1 8/2002 Clapp, Jr. et al.
6,442,322 B1 8/2002 Chen et al.
6,442,323 B1 8/2002 Sorosiak
6,445,866 B1 9/2002 Clairadin et al.
6,452,925 B1 9/2002 Sistanizadeh et al.
6,453,033 B1 9/2002 Little et al.
6,464,402 B1 10/2002 Andrews et al.
6,464,404 B1 10/2002 Robinson et al.
D466,087 S 11/2002 Cuny et al.
6,480,487 B1 11/2002 Wegleitner et al.
6,480,661 B2 11/2002 Kadar-Kallen et al.
6,483,977 B2 11/2002 Battey et al.
6,493,480 B1 12/2002 Lelic
6,494,623 B1 12/2002 Ahrens et al.
6,496,638 B1 12/2002 Andersen
6,496,640 B1 12/2002 Harvey et al.
6,504,988 B1 1/2003 Trebesch et al.
6,510,273 B2 1/2003 Ali et al.
6,526,210 B1 2/2003 Harrison et al.
6,532,332 B2 3/2003 Solheid et al.
6,535,682 B1 3/2003 Puetz et al.
6,537,106 B1 3/2003 Follingstad
6,539,147 B1 3/2003 Mahony
6,539,160 B2 3/2003 Battey et al.
6,542,688 B1 4/2003 Battey et al.
6,547,445 B2 4/2003 Kiani
6,547,450 B2 4/2003 Lampert
6,554,483 B1 4/2003 Sun et al.
6,554,485 B1 4/2003 Beatty et al.
6,556,763 B1 4/2003 Puet et al.
6,573,451 B2 6/2003 Komiya et al.
6,577,595 B1 6/2003 Counterman
6,591,051 B2 7/2003 Solheid et al.
6,594,434 B1 7/2003 Davidson et al.
6,594,436 B2 7/2003 Sun et al.
6,597,670 B1 7/2003 Tweedy et al.
6,600,860 B2 7/2003 Sun et al.
6,600,866 B2 7/2003 Gatica et al.
6,614,980 B1 9/2003 Mahony
6,619,853 B2 9/2003 Grois et al.
6,621,975 B2 9/2003 Laporte et al.
6,623,170 B2 9/2003 Petrillo
6,625,375 B1 9/2003 Mahony
6,628,866 B1 9/2003 Wilson et al.
6,631,237 B2 10/2003 Knudsen et al.
RE38,311 E 11/2003 Wheeler
6,648,376 B2 11/2003 Christianson
6,654,536 B2 11/2003 Battey et al.
6,661,961 B1 12/2003 Allen et al.
6,668,124 B2 12/2003 Kondo et al.
6,668,127 B1 12/2003 Mahony
6,688,780 B2 2/2004 Duran
6,690,862 B1 2/2004 Rietveld
6,690,867 B2 2/2004 Melton et al.
6,697,560 B1 2/2004 Kondo et al.
6,709,607 B2 3/2004 Hibbs-Brenner et al.
6,711,339 B2 3/2004 Puetz et al.
6,736,670 B2 5/2004 Clark et al.
6,748,154 B2 6/2004 O'Leary et al.
6,755,574 B2 6/2004 Fujiwara et al.
6,760,530 B1 7/2004 Mandry
6,760,531 B1 7/2004 Solheid et al.
6,761,585 B2 7/2004 Clark et al.
6,763,166 B2 7/2004 Yow, Jr. et al.
6,764,221 B1 7/2004 de Jong et al.
6,768,860 B2 7/2004 Liberty
6,775,458 B2 8/2004 Yow, Jr. et al.
6,778,752 B2 8/2004 Laporte et al.
6,779,906 B1 8/2004 Delmar
6,788,786 B1 9/2004 Kessler et al.
6,788,846 B2 9/2004 Hileman et al.
6,792,190 B2 9/2004 Xin et al.
6,792,191 B1 9/2004 Clapp, Jr. et al.
6,793,399 B1 9/2004 Nguyen
6,793,517 B2 9/2004 Neer et al.
6,796,717 B2 9/2004 Petrillo
6,801,680 B2 10/2004 Lin
6,808,444 B1 10/2004 Kuprin et al.
6,810,193 B1 10/2004 Muller
6,815,612 B2 11/2004 Bloodworth et al.
6,819,821 B2 11/2004 Lacey et al.
6,843,606 B2 1/2005 Deane et al.
6,845,207 B2 1/2005 Schray
6,845,208 B2 1/2005 Thibault et al.
6,850,671 B2 2/2005 Carnevale et al.
6,850,685 B2 2/2005 Tinucci et al.
6,853,795 B2 2/2005 Dagley et al.
6,865,330 B2 3/2005 Lecomte et al.
6,870,734 B2 3/2005 Mertesdorf et al.
6,873,773 B2 3/2005 Sun et al.
6,888,069 B1 5/2005 Chen et al.
6,901,200 B2 5/2005 Schray
6,909,833 B2 6/2005 Henschel et al.
6,912,349 B2 6/2005 Clark et al.
6,916,199 B2 7/2005 Follingstad

(56) References Cited

U.S. PATENT DOCUMENTS 6,920,213 B2 7/2005 Pershan
6,920,274 B2 7/2005 Rapp et al.
6,925,241 B2 8/2005 Bohle et al.
6,934,457 B2 8/2005 Vincent et al.
6,937,800 B2 8/2005 Cote
6,950,593 B2 9/2005 Hodge et al.
6,959,139 B2 10/2005 Erwin et al.
6,968,111 B2 11/2005 Trebesch et al.
6,980,725 B1 12/2005 Swieconek
6,983,095 B2 1/2006 Reagan et al.
H2144 H 2/2006 Baechtle et al.
7,006,748 B2 2/2006 Dagley et al.
7,018,113 B1 3/2006 Wang et al.
7,020,359 B2 3/2006 Mayer
7,029,322 B2 4/2006 Ernst et al.
7,058,245 B2 6/2006 Farahi
7,062,177 B1 6/2006 Grivna et al.
7,066,762 B2 6/2006 Neer et al.
7,066,771 B2 6/2006 Clark et al.
7,068,907 B2 6/2006 Schray
7,075,565 B1 7/2006 Raymond et al.
7,086,539 B2 8/2006 Knudsen et al.
7,088,899 B2 8/2006 Reagan et al.
7,090,084 B2 8/2006 Knudsen et al.
7,092,592 B2 8/2006 Verhagen et al.
7,094,095 B1 8/2006 Caveney
7,102,884 B2 9/2006 Mertesdorf et al.
7,103,255 B2 9/2006 Reagan et al.
7,113,686 B2 9/2006 Bellekens et al.
7,130,498 B2 10/2006 Meis et al.
7,139,456 B2 11/2006 Sasaki et al.
7,139,461 B2 11/2006 Puetz et al.
7,142,764 B2 11/2006 Allen et al.
7,142,765 B2 11/2006 Rapp et al.
7,146,089 B2 12/2006 Reagan et al.
7,149,398 B2 12/2006 Solheid et al.
7,171,102 B2 1/2007 Reagan et al.
7,179,119 B2 2/2007 Follingstad
7,186,032 B1 3/2007 Stevens et al.
7,194,181 B2 3/2007 Holmberg et al.
7,198,409 B2 4/2007 Smith et al.
7,200,317 B2 4/2007 Reagan et al.
7,218,827 B2 5/2007 Vongseng et al.
7,233,712 B2 6/2007 Arellano
7,233,731 B2 6/2007 Solheid et al.
7,241,182 B2 7/2007 Clark et al.
7,244,144 B2 7/2007 Follingstad
7,248,772 B2 7/2007 Suzuki et al.
7,252,520 B1 8/2007 Millard et al.
7,277,620 B2 10/2007 Vongseng et al.
7,302,153 B2 11/2007 Thom
7,330,546 B2 2/2008 Kessler et al.
7,333,707 B2 2/2008 Puetz et al.
7,335,056 B1 2/2008 Clark et al.
7,346,254 B2 3/2008 Kramer et al.
7,352,921 B2 4/2008 Saito et al.
7,357,667 B2 4/2008 Clark et al.
7,367,823 B2 5/2008 Rapp et al.
7,369,741 B2 5/2008 Reagan et al.
7,376,321 B2 5/2008 Bolster et al.
7,376,322 B2 5/2008 Zimmel et al.
7,376,323 B2 5/2008 Zimmel
7,377,697 B2 5/2008 Kahle et al.
7,391,952 B1 6/2008 Ugolini et al.
7,400,813 B2 7/2008 Zimmel
7,400,816 B2 7/2008 Reagan et al.
7,406,240 B2 7/2008 Murano
7,407,330 B2 8/2008 Smith et al.
7,408,769 B2 8/2008 Mertesdorf et al.
7,412,147 B2 8/2008 Scadden
7,416,349 B2 8/2008 Kramer
7,418,181 B2 8/2008 Zimmel et al.
7,418,182 B2 8/2008 Krampotich
7,433,915 B2 10/2008 Edwards et al.
7,437,049 B2 10/2008 Krampotich
7,455,548 B2 11/2008 Clark et al.
7,457,503 B2 11/2008 Solheid et al.
7,460,757 B2 12/2008 Hoehne et al.
7,471,869 B2 12/2008 Reagan et al.
7,493,002 B2 2/2009 Coburn et al.
7,493,044 B2 2/2009 Kozischek et al.
7,496,268 B2 2/2009 Escoto et al.
7,515,805 B2 4/2009 Vongseng et al.
7,519,259 B2 4/2009 Smith et al.
7,532,782 B2 5/2009 Bragg et al.
7,534,054 B2 5/2009 Hudgins
7,534,135 B2 5/2009 Follingstad
7,543,993 B2 6/2009 Blauvelt et al.
7,544,090 B2 6/2009 Follingstad
7,553,091 B2 6/2009 McColloch
7,555,193 B2 6/2009 Rapp et al.
7,591,667 B2 9/2009 Gatnau Navarro et al.
7,623,749 B2 11/2009 Reagan et al.
7,627,204 B1 12/2009 Deane
7,646,958 B1 1/2010 Reagan et al.
7,668,427 B2 2/2010 Register
7,686,658 B2 3/2010 Clark et al.
7,689,079 B2 3/2010 Burnham et al.
7,689,089 B2 3/2010 Wagner et al.
7,706,656 B2 4/2010 Zimmel
7,715,680 B2 5/2010 Krampotich
7,722,261 B2 5/2010 Kadar-Kallen et al.
7,738,755 B2 6/2010 Shioda
7,738,760 B2 6/2010 Fredrickson et al.
7,747,125 B1 6/2010 Lee et al.
RE41,460 E 7/2010 Wheeler
7,751,674 B2 7/2010 Hill
7,756,371 B1 7/2010 Burnham et al.
7,773,843 B2 8/2010 Cody et al.
7,775,725 B2 8/2010 Grinderslev
7,789,669 B1 9/2010 Duesterhoeft et al.
7,805,043 B2 9/2010 Puetz et al.
7,809,232 B2 10/2010 Reagan et al.
7,809,233 B2 10/2010 Smith et al.
7,809,234 B2 10/2010 Smith et al.
7,809,235 B2 10/2010 Reagan et al.
7,822,313 B2 10/2010 Rapp et al.
7,826,706 B2 11/2010 Vongseng et al.
7,841,775 B2 11/2010 Smith et al.
7,844,159 B2 11/2010 Solheid et al.
7,844,161 B2 11/2010 Reagan et al.
7,856,166 B2 12/2010 Biribuze et al.
7,873,255 B2 1/2011 Reagan et al.
7,889,961 B2 2/2011 Cote et al.
7,934,948 B2 5/2011 Follingstad
7,942,004 B2 5/2011 Hodder
7,945,138 B2 5/2011 Hill et al.
7,961,999 B2 6/2011 Frohlich et al.
7,983,521 B2 7/2011 Rapp et al.
8,019,192 B2 9/2011 Puetz et al.
8,032,032 B2 10/2011 Chand et al.
8,041,221 B2 10/2011 Elberbaum
8,059,932 B2 11/2011 Hill et al.
8,078,017 B2 12/2011 Kodama et al.
8,085,472 B2 12/2011 Kadar-Kallen
8,113,723 B2 2/2012 Togami et al.
8,139,913 B2 3/2012 Bolster et al.
8,184,938 B2 5/2012 Cooke et al.
8,195,022 B2 6/2012 Coburn et al.
8,280,205 B2 10/2012 Erdman et al.
8,280,216 B2 10/2012 Cooke et al.
8,292,518 B2 10/2012 Togami et al.
8,313,249 B2 11/2012 Gurreri et al.
8,342,755 B2 1/2013 Nhep
8,358,900 B2 1/2013 Rapp et al.
8,374,477 B2 2/2013 Hill
8,376,634 B2 2/2013 Oki et al.
8,406,587 B2 3/2013 Mudd et al.
8,417,074 B2 4/2013 Nhep et al.
8,428,418 B2 4/2013 Smrha
8,457,458 B2 6/2013 Kadar-Kallen et al.
8,463,091 B2 6/2013 Kewitsch
8,466,848 B2 6/2013 Guy et al.
8,485,737 B2 7/2013 Kolesar

(56) References Cited

U.S. PATENT DOCUMENTS 8,550,724 B2 10/2013 Oki
8,550,725 B2 10/2013 Oki
8,579,521 B2 11/2013 Oki et al.
8,588,566 B2 11/2013 Matsuyama et al.
8,600,208 B2 12/2013 Badar et al.
8,649,648 B2 2/2014 Coburn et al.
8,690,593 B2 4/2014 Anderson et al.
8,693,836 B2 4/2014 Kimbrell et al.
8,712,206 B2 4/2014 Cooke et al.
8,821,037 B2 9/2014 Oki et al.
8,821,038 B2 9/2014 Oki et al.
8,886,335 B2 11/2014 Pianca et al.
9,011,020 B2 4/2015 Ty Tan et al.
9,031,360 B2 5/2015 Schneider et al.
9,075,216 B2 7/2015 Cote et al.
9,091,818 B2 7/2015 Kadar-Kallen
9,223,094 B2 12/2015 Schneider et al.
9,229,172 B2 1/2016 Eberle, Jr.
9,329,353 B2 5/2016 Solheid et al.
9,341,786 B1 5/2016 Gamache et al.
9,354,416 B2 5/2016 Solheid et al.
9,417,418 B2 8/2016 Eberle, Jr. et al.
9,488,788 B2 11/2016 Murray et al.
9,753,229 B2 9/2017 Murray et al.
9,874,711 B2 1/2018 Schneider et al.
9,897,767 B2 2/2018 Murray et al.
10,031,295 B2 7/2018 Eberle, Jr. et al.
10,067,295 B2 9/2018 Eberle, Jr.
10,149,619 B2 12/2018 Ito et al.
10,209,454 B2 2/2019 Isenhour et al.
10,295,761 B2 5/2019 Murray et al.
10,317,638 B2 6/2019 Schneider et al.
10,379,311 B1 8/2019 Krywicki et al.
10,451,809 B2 10/2019 Eberle, Jr. et al.
10,620,382 B2 4/2020 Eberle, Jr.
10,739,534 B2 8/2020 Murray et al.
10,754,096 B2 8/2020 Murray et al.
10,782,483 B2 9/2020 Eberle, Jr. et al.
10,955,633 B2 3/2021 Schneider et al.
11,036,012 B2 6/2021 Murray et al.
11,372,165 B2 6/2022 Eberle, Jr. et al.
11,409,068 B2 8/2022 Marcouiller et al.
11,573,389 B2 2/2023 Schneider et al.
11,592,628 B2 2/2023 Murray et al.
11,609,400 B2 3/2023 Marcouiller et al.
2001/0009136 A1 7/2001 Bryning et al.
2001/0041025 A1 11/2001 Farahi
2002/0015563 A1* 2/2002 Murakami ........... G02B 6/4472 385/53
2002/0034290 A1 3/2002 Pershan
2002/0090191 A1 7/2002 Sorosiak
2002/0097962 A1 7/2002 Yoshimura et al.
2002/0102088 A1 8/2002 Kondo et al.
2002/0131719 A1* 9/2002 Grois ....................... G02B 6/43 385/59
2002/0150372 A1 10/2002 Schray et al.
2002/0174691 A1 11/2002 Arishima et al.
2002/0181893 A1 12/2002 White et al.
2002/0181922 A1 12/2002 Xin et al.
2002/0186954 A1 12/2002 Liu et al.
2003/0002812 A1 1/2003 Lampert
2003/0007742 A1 1/2003 Kowatsch
2003/0007767 A1 1/2003 Douglas et al.
2003/0016925 A1 1/2003 Sun et al.
2003/0031436 A1 2/2003 Simmons et al.
2003/0031452 A1 2/2003 Simmons et al.
2003/0042040 A1 3/2003 Komiya et al.
2003/0044141 A1 3/2003 Melton et al.
2003/0048999 A1 3/2003 Imabayashi et al.
2003/0059526 A1 3/2003 Benson et al.
2003/0072535 A1 4/2003 Sun et al.
2003/0072537 A1 4/2003 Eichenberger et al.
2003/0095772 A1 5/2003 Solheid et al.
2003/0128951 A1 7/2003 Lecomte et al.
2003/0138187 A1* 7/2003 Kawase .................. G02B 6/43 385/14
2003/0142949 A1 7/2003 Hicks et al.
2003/0147597 A1 8/2003 Duran
2003/0165315 A1 9/2003 Trebesch et al.
2003/0169570 A1 9/2003 Brebner et al.
2003/0174953 A1 9/2003 Carnevale et al.
2003/0174996 A1 9/2003 Henschel et al.
2003/0180012 A1 9/2003 Deane et al.
2003/0182015 A1 9/2003 Domaille et al.
2003/0198427 A1 10/2003 Bragg et al.
2003/0198446 A1 10/2003 Sun et al.
2003/0223724 A1 12/2003 Puetz et al.
2004/0028368 A1 2/2004 Hileman et al.
2004/0033007 A1 2/2004 Ohtsu et al.
2004/0062488 A1 4/2004 Wood
2004/0074852 A1 4/2004 Knudsen et al.
2004/0109660 A1 6/2004 Liberty
2004/0114874 A1 6/2004 Bono et al.
2004/0126069 A1 7/2004 Jong et al.
2004/0136638 A1 7/2004 Baechtle et al.
2004/0161212 A1 8/2004 Sun et al.
2004/0165852 A1 8/2004 Erwin et al.
2004/0172492 A1 9/2004 Farnworth et al.
2004/0175090 A1 9/2004 Vastmans et al.
2004/0179771 A1 9/2004 Verhagen et al.
2004/0213505 A1 10/2004 Saito et al.
2004/0228598 A1 11/2004 Allen et al.
2004/0264873 A1 12/2004 Smith et al.
2005/0002633 A1 1/2005 Solheid et al.
2005/0003697 A1 1/2005 Neer et al.
2005/0018950 A1 1/2005 Arellano
2005/0023656 A1 2/2005 Leedy
2005/0048831 A1 3/2005 Neer et al.
2005/0053337 A1 3/2005 Mayer
2005/0084200 A1 4/2005 Meis et al.
2005/0111801 A1 5/2005 Garman et al.
2005/0123261 A1 6/2005 Bellekens et al.
2005/0129379 A1 6/2005 Reagan et al.
2005/0226566 A1 10/2005 Sasaki et al.
2006/0029353 A1 2/2006 Bolster et al.
2006/0088258 A1 4/2006 Sasaki et al.
2006/0093274 A1 5/2006 Kahle et al.
2006/0093301 A1 5/2006 Zimmel et al.
2006/0098914 A1 5/2006 Tourne
2006/0165366 A1 7/2006 Feustel et al.
2006/0177175 A1 8/2006 Mayer et al.
2006/0210222 A1 9/2006 Watte et al.
2006/0210229 A1 9/2006 Scadden
2006/0228086 A1 10/2006 Holmberg et al.
2006/0245756 A1 11/2006 Kozischek et al.
2006/0257657 A1 11/2006 Curran et al.
2006/0269205 A1 11/2006 Zimmel
2006/0269206 A1 11/2006 Zimmel
2007/0003204 A1 1/2007 Makrides-Saravanos et al.
2007/0025672 A1 2/2007 Suzuki et al.
2007/0025675 A1 2/2007 Kramer
2007/0047893 A1 3/2007 Kramer et al.
2007/0086694 A1 4/2007 Murphy et al.
2007/0189692 A1 8/2007 Zimmel et al.
2007/0206902 A1 9/2007 Blauvelt et al.
2007/0230863 A1 10/2007 Fukuda et al.
2007/0237449 A1 10/2007 Aoki et al.
2007/0239232 A1 10/2007 Kurtz et al.
2008/0008436 A1 1/2008 Reagan et al.
2008/0008437 A1 1/2008 Reagan et al.
2008/0017985 A1 1/2008 Kilger
2008/0019655 A1 1/2008 Vongseng et al.
2008/0025684 A1 1/2008 Vongseng et al.
2008/0031576 A1 2/2008 Hudgins
2008/0089656 A1 4/2008 Wagner et al.
2008/0089691 A1 4/2008 Hudgins
2008/0095501 A1 4/2008 McColloch
2008/0124038 A1 5/2008 Kowalczyk et al.
2008/0131067 A1 6/2008 Ugolini et al.
2008/0145011 A1 6/2008 Register
2008/0175548 A1 7/2008 Knecht et al.
2008/0175550 A1 7/2008 Coburn et al.
2008/0187276 A1 8/2008 Roberts et al.

(56) References Cited

U.S. PATENT DOCUMENTS

2008/0273846 A1 11/2008 Register
2008/0298748 A1 12/2008 Cox et al.
2008/0310854 A1 12/2008 Takai et al.
2008/0317425 A1 12/2008 Smith et al.
2009/0010600 A1 1/2009 Kim et al.
2009/0041417 A1 2/2009 Rapp et al.
2009/0067800 A1 3/2009 Vazquez et al.
2009/0067802 A1 3/2009 Hoehne et al.
2009/0074372 A1 3/2009 Solheid et al.
2009/0087157 A1 4/2009 Smith et al.
2009/0097797 A1 4/2009 Kewitsch
2009/0097800 A1 4/2009 Gurreri et al.
2009/0097813 A1 4/2009 Hill
2009/0134318 A1 5/2009 Kuniyoshi et al.
2009/0142026 A1 6/2009 Shioda
2009/0180737 A1 7/2009 Burnham et al.
2009/0190896 A1 7/2009 Smith et al.
2009/0196563 A1 8/2009 Mullsteff et al.
2009/0196565 A1 8/2009 Vongseng et al.
2009/0245743 A1 10/2009 Cote et al.
2009/0257726 A1 10/2009 Redmann et al.
2009/0269018 A1 10/2009 Frohlich et al.
2009/0274431 A1 11/2009 Krampotich et al.
2009/0285540 A1 11/2009 Reagan et al.
2009/0290843 A1 11/2009 Reagan et al.
2009/0297111 A1 12/2009 Reagan et al.
2009/0324189 A1 12/2009 Hill et al.
2010/0054683 A1 3/2010 Cooke et al.
2010/0086260 A1 4/2010 Parikh et al.
2010/0124421 A1 5/2010 Chand et al.
2010/0129028 A1 5/2010 Nhep et al.
2010/0142910 A1 6/2010 Hill et al.
2010/0158465 A1 6/2010 Smrha
2010/0166370 A1 7/2010 Cody et al.
2010/0195955 A1 8/2010 Burnham et al.
2010/0238428 A1 9/2010 Glines et al.
2010/0296790 A1 11/2010 Cooke et al.
2010/0298895 A1 11/2010 Ghaffari et al.
2010/0310221 A1 12/2010 Le Dissez
2010/0316334 A1 12/2010 Kewitsch
2010/0316335 A1 12/2010 Furuyama
2010/0322562 A1 12/2010 Barnes et al.
2010/0322576 A1 12/2010 Rhoney et al.
2010/0322577 A1 12/2010 Bolster et al.
2010/0322579 A1 12/2010 Cooke et al.
2010/0329620 A1 12/2010 Griffiths et al.
2011/0002586 A1 1/2011 Nhep
2011/0019964 A1 1/2011 Nhep et al.
2011/0034912 A1 2/2011 de Graff et al.
2011/0044599 A1 2/2011 Kowalczyk et al.
2011/0065909 A1 3/2011 Lange et al.
2011/0081114 A1 4/2011 Togami et al.
2011/0085764 A1 4/2011 Greub et al.
2011/0085771 A1 4/2011 Matsuyama et al.
2011/0096404 A1 4/2011 Kadar-Kallen
2011/0103748 A1 5/2011 Ott
2011/0103797 A1 5/2011 Oki et al.
2011/0103803 A1 5/2011 Kolesar
2011/0110673 A1 5/2011 Elberbaum
2011/0116748 A1 5/2011 Smrha et al.
2011/0182558 A1 7/2011 Garcia et al.
2011/0217016 A1 9/2011 Mullsteff
2011/0222823 A1 9/2011 Pitwon
2011/0222829 A1 9/2011 Loeffelholz et al.
2011/0225792 A1 9/2011 Oki et al.
2011/0229095 A1 9/2011 Oki
2011/0229096 A1 9/2011 Oki
2011/0255831 A1 10/2011 Oki et al.
2011/0262077 A1 10/2011 Anderson et al.
2011/0262078 A1 10/2011 Oki et al.
2011/0268404 A1 11/2011 Cote et al.
2011/0268408 A1 11/2011 Giraud et al.
2011/0268410 A1 11/2011 Giraud et al.
2011/0268412 A1 11/2011 Giraud et al.
2011/0268414 A1 11/2011 Giraud et al.
2011/0274400 A1 11/2011 Mudd et al.
2011/0317973 A1 12/2011 Rapp et al.
2012/0002934 A1 1/2012 Kimbrell et al.
2012/0008900 A1 1/2012 Schneider
2012/0014645 A1 1/2012 Kadar-Kallen
2012/0020618 A1 1/2012 Erdman et al.
2012/0020619 A1 1/2012 Kadar-Kallen et al.
2012/0051706 A1 3/2012 van Geffen et al.
2012/0051708 A1 3/2012 Badar et al.
2012/0057838 A1 3/2012 Hill et al.
2012/0148198 A1 6/2012 Togami et al.
2012/0189259 A1 7/2012 Manes
2012/0213469 A1 8/2012 Jia et al.
2012/0263415 A1 10/2012 Tan et al.
2012/0276549 A1 11/2012 Cunningham et al.
2012/0288233 A1 11/2012 Barnes et al.
2012/0301098 A1 11/2012 Benedetto et al.
2012/0309080 A1 12/2012 Cunningham et al.
2013/0014936 A1 1/2013 Griffith
2013/0039616 A1 2/2013 Shambat et al.
2013/0064495 A1 3/2013 Eberle, Jr.
2013/0064506 A1 3/2013 Eberle, Jr. et al.
2013/0077913 A1 3/2013 Schneider et al.
2013/0089292 A1 4/2013 Ott et al.
2013/0148926 A1 6/2013 Koshinz et al.
2013/0148936 A1 6/2013 Hill
2013/0170797 A1 7/2013 Ott
2013/0287356 A1 10/2013 Solheid et al.
2013/0343700 A1 12/2013 Kolesar
2014/0086545 A1 3/2014 Solheid et al.
2014/0133810 A1* 5/2014 Schneider ............ G02B 6/4453 385/89
2014/0205244 A1 7/2014 Bradley
2014/0212095 A1 7/2014 Isenhour et al.
2014/0270636 A1 9/2014 Manes
2014/0303452 A1 10/2014 Ghaffari
2015/0253514 A1 9/2015 Murray et al.
2015/0260927 A1 9/2015 Murray et al.
2016/0259141 A1 9/2016 Schneider et al.
2017/0153399 A1 6/2017 Rodriguez
2019/0025521 A1 1/2019 Geens et al.
2020/0348471 A1 11/2020 Murray et al.
2020/0386949 A1 12/2020 Eberle, Jr.
2021/0011228 A1 1/2021 Murray et al.
2021/0072463 A1 3/2021 Zitsch et al.
2021/0263252 A1 8/2021 Schneider et al.
2023/0266552 A1 8/2023 Schneider et al.

FOREIGN PATENT DOCUMENTS

CN 1248329 A 1/1998
CN 2426610 Y 4/2001
CN 1277137 C 9/2006
CN 102057306 A 5/2011
CN 102272650 A 12/2011
CN 104335091 A 2/2015
CN 104823091 A 8/2015
DE 2735106 A1 2/1979
DE 3308682 A1 9/1984
DE 4207531 A1 9/1992
DE 4229510 A1 3/1994
EP 0146478 A2 6/1985
EP 0149250 A2 7/1985
EP 0196102 A2 10/1986
EP 0211208 A1 2/1987
EP 0293183 A2 11/1988
EP 0 349 290 A1 1/1990
EP 0406151 A2 1/1991
EP 0479226 A1 4/1992
EP 0196102 B1 3/1993
EP 0538164 A1 4/1993
EP 0585809 A1 3/1994
EP 0587336 A2 3/1994
EP 0697610 A1 2/1996
EP 0743701 A1 11/1996
EP 0788002 A1 8/1997

(56) References Cited

FOREIGN PATENT DOCUMENTS

| | | | |
|---|---|---|---|
| EP | 0871047 | A1 | 10/1998 |
| EP | 0563995 | B1 | 10/1999 |
| EP | 0975180 | A1 | 1/2000 |
| EP | 1045267 | A1 | 10/2000 |
| EP | 1067418 | A1 | 1/2001 |
| EP | 1102095 | A1 | 5/2001 |
| EP | 1103832 | A2 | 5/2001 |
| EP | 1162487 | A2 | 12/2001 |
| EP | 1884809 | A1 | 2/2008 |
| FR | 2531576 | A1 | 2/1984 |
| FR | 2587127 | A1 | 3/1987 |
| GB | 2239104 | A | 6/1991 |
| GB | 2367902 | A | 4/2002 |
| JP | 59-74523 | A | 4/1984 |
| JP | 60-169811 | A | 9/1985 |
| JP | 61-53076 | A | 3/1986 |
| JP | 61-55607 | A | 3/1986 |
| JP | 61-90104 | A | 5/1986 |
| JP | 63-229409 | A | 9/1988 |
| JP | H06-186438 | A | 7/1994 |
| JP | H07-209526 | A | 8/1995 |
| JP | H07-281052 | A | 10/1995 |
| JP | H08-286081 | A | 11/1996 |
| JP | H09-90171 | A | 4/1997 |
| JP | H10-10368 | A | 1/1998 |
| JP | H10-68853 | A | 3/1998 |
| JP | H10-339818 | A | 12/1998 |
| JP | 2001-255421 | A | 9/2001 |
| JP | 2002-174736 | A | 6/2002 |
| JP | 1144266 | S | 6/2002 |
| JP | 2002-211945 | A | 7/2002 |
| JP | 3307618 | B2 | 7/2002 |
| JP | 2002-253341 | A | 9/2002 |
| JP | 2002-254306 | | 9/2002 |
| JP | 2002-311252 | A | 10/2002 |
| JP | 2004-109237 | A | 4/2004 |
| JP | 2005-257887 | A | 9/2005 |
| JP | 3761762 | B2 | 3/2006 |
| JP | 2007-233144 | A | 9/2007 |
| JP | 2007-318741 | A | 12/2007 |
| JP | 2010-19895 | | 1/2010 |
| JP | 2010-239535 | A | 10/2010 |
| JP | 4749566 | B2 | 5/2011 |
| JP | 2011-191333 | A | 9/2011 |
| JP | 4851430 | B2 | 1/2012 |
| JP | 4911130 | B2 | 1/2012 |
| KR | 10-2005-0034103 | | 4/2005 |
| WO | 90/09708 | A1 | 8/1990 |
| WO | 91/10927 | A1 | 7/1991 |
| WO | 94/17534 | A1 | 8/1994 |
| WO | 95/20175 | A1 | 7/1995 |
| WO | 98/36309 | A1 | 8/1998 |
| WO | 98/53347 | A2 | 11/1998 |
| WO | 99/13367 | A2 | 3/1999 |
| WO | 99/27404 | A1 | 6/1999 |
| WO | 99/46621 | A1 | 9/1999 |
| WO | 00/05611 | A2 | 2/2000 |
| WO | 00/07053 | A2 | 2/2000 |
| WO | 00/52504 | A2 | 9/2000 |
| WO | 03/093883 | A2 | 11/2000 |
| WO | 00/75706 | A2 | 12/2000 |
| WO | 01/61317 | A1 | 8/2001 |
| WO | 01/75495 | A2 | 10/2001 |
| WO | 02/21182 | A1 | 3/2002 |
| WO | 02/103429 | A2 | 12/2002 |
| WO | 03/021312 | A1 | 3/2003 |
| WO | 2008/027201 | A2 | 3/2008 |
| WO | 2008/089192 | A1 | 7/2008 |
| WO | 2009/120280 | A2 | 10/2009 |
| WO | 2011/094327 | A1 | 8/2011 |
| WO | 2011/100613 | A1 | 8/2011 |
| WO | 2013/106820 | A1 | 7/2013 |
| WO | 2017/121778 | A1 | 7/2017 |

OTHER PUBLICATIONS

"ADC OMX 600 Optical Distribution Frame Solution," ADC Telecommunications, Inc., Publication No. 856, 8 pgs. (Feb. 2000).

ADC Telecommunications brochure entitled "Fiber Cable Management Products, Second Edition," 144 pages, dated Oct. 1995.

ADC Telecommunications, Inc. brochure entitled "FL2000 Products," Publication No. 803, 51 pages (Nov. 1996).

ADC Telecommunications brochure entitled "Next Generation Frame (NGF) Product Family Ordering Guide," 22 pages, dated Oct. 1998.

ADC Telecommunications, Inc., brochure entitled "Value-Added Module (VAM) System: Monitor, Splitter, WDM and CWDM Modules and Chassis for Switching Office, Central Exchange and Headend Applications, 1st edition," Part No. 101663BE, 36 pages (Feb. 2008).

ADC Telecommunications, Inc., "Value-Added Module (VAM) System—Monitor, Splitter, WDM/CWDM/DWDM Modules and Chassis—5th Edition," Oct. 2009, 32 Pages.

ADC Telecommunications, Inc., 600 mm Products, Value-Added Module System, pp. 53-78 (Oct. 2003).

ADC Telecommunications, Inc., brochure entitled "Value-Added Module System," Publication No. 891, 29 pages (Apr. 2000).

ADC Telecommunications, Inc., brochure entitled "Value-Added Module System: Optical Distribution Frame (OMX™ 600)," Publication No. 891-OMX, 11 pages (Jan. 2002).

ADC Telecommunications, Inc., brochure entitled "Fiber Management Tray: 2 Rack Unit (2 RU) Style FMT-G Series," Publication No. 1258896, 8 pages (Mar. 2003).

ADC Telecommunications, Inc., FMT Micro Value Added Monitor Module Configuration Scheme, pp. 1-2 (Feb. 6, 2003).

ADC Telecommunications, Inc., Mini VAM Connector Cleaning Instructions, ADCP-90-412, Issue 3, pp. 1-8 (Sep. 2002).

ADC Telecommunications, Inc., Mini VAM Splitter Mod (Installation Drawing), Drawing No. 1128185, 2 pages (Mar. 14, 2001).

ADC Telecommunications, Inc., Next Generation Frame (NGF) Product Tour, Value Added Modules (VAMs), Copyright 2003, 1 page, (admitted as offered for sale as of Apr. 25, 2006).

ADC Telecommunications, Inc., brochure entitled "Fiber Panel Products, Second Edition," front cover, Table of Contents, and pp. 1-111, Publication No. 846 (Jul. 1996) (116 pages total).

ADC Telecommunications, Inc.'s 6th Edition of Next Generation Frame (NGF) Product Family Ordering Guide; front cover, Table of Contents, pp. 1-41, and back cover; Item No. 820 (revised Feb. 2003) (44 pages total).

ADC Telecommunications, Inc.'s Fiber Optic, Cable Assemblies and Accessories Brochure; front cover, Table of Contents, pp. 1-23, and back cover; Item No. 100300 (revised Apr. 2003).

ADC Telecommunications, Inc., Next Generation Frame (NGF) Product Family, Publication No. 832, 8 pages, (Dec. 2000).

ADC Telecommunications, Inc., brochure entitled "Secure Fiber Entrance Terminal (SFET)," front cover, pp. 2-7, and back cover, Item No. 1005 (revised May 1998) (8 pages total).

ADC Telecommunications, Inc., brochure entitled "Outside Plant, Fiber Cross-Connect Solutions," front cover, Table of Contents, pp. 1-48, and back cover, Item No. 1047 (Jun. 2002).

Alcoa Fujikura Ltd., brochure entitled "Couplers: Couplers WDMS Packaging,", 5 pages (copyright 2000).

AMP Inc. catalog entitled "Fiber Optic Products," front and back covers and p. 59, (4 pgs.) (© 1991).

Assembly reference drawings having drawing No. 1067101, dated Aug. 17, 1999 (8 pages).

AT&T Network Systems catalog entitled "Fiber Optic Products Innovation for wide ranging applications," front and back covers and pp. 6-1 through 6-16 (18 pages total) (© 1995).

AT&T Network Systems, Product Bulletin, "High Density Interconnect System (HDIC)," 2987D-DLH-7/89, Issue 2, 4 pages (Copyright 1989).

ATI Optique Catalog, ATI Optique Division of TI electronique, Version 2.6, released Mar. 27, 2002 (50 pages).

Amphenol Corp., brochure entitled "Amphenol® 954 Series one piece SC Connector," F122-00311, Issue 1, 2 pages (Aug. 1990).

21 photographs showing what AFL Telecommunications LLC purports to be the ECOE cabinet referenced in the Prior art statement

(56) References Cited

OTHER PUBLICATIONS and the Supplemental prior art statement listed above. AFL Telecommunications LLC asserts the cabinet was on sale as early as 2001.
24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).
Bockstaele et al., "A scalable parallel optical interconnect family," IO Overview Paper, Apr. 2004 (10 pages).
First Office Action for Chinese Patent Application No. 201880064427.4 mailed Mar. 2, 2021, 9 pages.
Connectorized splitter drawings having drawing No. 1067961, dated Aug. 18, 1999 (2 pages).
Corning Cable Systems, "Installation Instructions for 12-position Splice Protector Insert," SRP-001-276, Issue 4, 1 page (Jul. 2001).
Corning Cable Systems, "Jumper Routing Procedure for Enhanced Management Frame," SRP-003-599, Issue 2, 4 pages (Apr. 2002).
Extended European Search Report for Application No. 18864713.5 mailed May 19, 2021.
Fiber distribution drawings having drawing No. 1069967, dated Aug. 17, 1999 (2 pages).
FONS Corporation, MDC Series Rack or Wall Mount Enclosures product sheet, 3 pages (2002).
FONS Corporation, Modular Distribution Cabinets Rack Mount Enclosures, Model MDC-7, product sheet, 2 pages (2005).
FONS Corporation's Technical Drawing No. 11669, Rev. D, of Distribution Cabinet Assembly MFDC-7, 1 page (technical drawing depicting the device shown in Exhibit M).
Grimes, "Applications of Parallel Optical Interconnects," Lasers and Electro-Optics Society Annual Meeting, Nov. 18-21, 1996, pp. 6-7, vol. 2 (2 pages).
Hasegawa et al., "100GHz-48CH Athermal AWG with a Novel Temperature Insensitive Principle," National Fiber Optics Engineers Conference, 2003 Technical Proceedings, pp. 801-808.
"High-density FlexPlane™ Optical Circuitry provides high-density optical routing on PCBs or backplanes", Molex, 3 pages (2012).
Hirose Electric Co., Ltd., catalog entitled "Optical Fibre Connectors," Catalog No. O.F. (9) 3K, front and back covers and pp. 16, 17 and 49 (Mar. 1991) (5 pages total).
http://www.youtube.com/watch?v=dNLFeCsa69E ; LK Flexible film Screen Protector Installation Video; May 8, 2017.
International Search Report and Written Opinion of the International Searching Authority for International Patent Application No. PCT/US2018/053935 mailed Mar. 29, 2019, 11 pages.
International Standard, "Fiber optic connector interfaces—Part 4-1: Type SC connector family—Simplified receptacle SC-PC connecter interfaces," Copyright IEC 61754-4-1, First edition, Jan. 2003 (9 pages).
Installation drawings having drawing No. 1069965, dated Aug. 14, 1999 (3 pages).
Iwano, S. et al., "MU-type Optical Fiber Connector System," NTT Review, vol. 9, No. 2, pp. 63-71 (Mar. 1997).
Nexans, "Cross-Connect Cabinet III: Plastic Watertight Cabinet for FTTH Applications," 2 pages (Oct. 2002).
Nexans, "Cross-Connect Cabinet V: Metallic Watertight Cabinet for FTTH Applications," 2 pages (Oct. 2002).
Northern Telecom Bulletin #91-004, Issue #2, 16 pages (May 1991).
NTT International, brochure entitled "Fiber Termination Module (FTM) & Premises Optical Distribution Cabinets (PODC)," 3 pages, undated.
"OMX™ 600 Optical Distribution Frame," ADC Telecommunications, Inc., Publication No. 854, front cover, table of contents, pp. 1-13, rear cover (Apr. 2000).
"Optical fiber coupler review," Manufacturing Group at the Optoelectronics Division, Technical Report 2001, Products Presentation, showing Sumitomo Osaka Cement Co. Ltd's Optical Coupler (pp. 41-42).
Precision Mechanical, in Chinese with English Translation, 5 pages (publicly known at least as early as Aug. 2002).
Preface to the book "Structure, Installation, Connection and Protection of Communication Optical Fiber Cable," in Chinese with English Translation, 14 pages (Mar. 1992).
Schneider et al., "Fibre Optic Circuits," TechCon 2011 (10 pages).
Shahid, M.A. et al., "Flexible Optical Backplane Interconnections," Proceedings of MPPOI'96, pp. 178-185 (1996).
Shahid et al., "Flexible High Density Optical Circuits," National Fiber Optic Engineers Conference, 2001 Technical Proceedings (8 pages).
Sugita et al., "SC-Type Single-Mode Optical Fiber Connectors," Journal of Lightwave Technology, vol. 7, No. 11, pp. 1689-1696 (Nov. 1989).
Tachikura et al., Newly Developed Optical Fiber Distribution System and Cable Management in Central Office, International Wire & Cable Symposium, Proceedings of the 50th IWCS, pp. 98-105.
U.S. Appl. No. 61/538,737, filed Sep. 23, 2011, entitled "Flexible Optical Circuit" (13 pages).
U.S. Appl. No. 61/707,323, filed Sep. 28, 2012 entitled "Fiber Optic Cassette."
U.S. Appl. No. 62/027,657, filed Jul. 22, 2014 entitled "Door Hinge Mechanism for Telecommunications Panel."

* cited by examiner

Paper
144
142
140
138
Paper
144
Adhesive
PET foil
Silicone Layer
138
Adhesive
PET foil
Adhesive
Removable Sticker
Carrier
142
140
136
134
132
130
126

128
Laser cut
Paper
Adhesive
PET foil
Silicone Layer
Adhesive
PET foil
Adhesive
Removable Sticker
Carrier
144
142
140
138
136
134
132
130
126

Coating
146
Fiber
102
Adhesive
142
PET foil
140
Silicone Layer
138
Adhesive
136
PET foil
134
Adhesive
132
Removable Sticker
130
Carrier
126

Fiber
102
Adhesive
142
PET foil
140
Silicone Layer
138
Adhesive
136
PET foil
134
Adhesive
132
Removable Sticker
130
Carrier
126

FIBER OPTIC CIRCUIT AND PREPARATION METHOD

CROSS-REFERENCE TO RELATED APPLICATION

This application is a Continuation of U.S. patent application Ser. No. 17/855,153, filed Jun. 30, 2022, now U.S. Pat. No. 11,609,400; which is a Continuation of U.S. patent application Ser. No. 16/753,268, filed on Apr. 2, 2020, now U.S. Pat. No. 11,409,068; which is a National Stage Application of PCT/US2018/053935, filed on Oct. 2, 2018; which claims the benefit of U.S. Patent Application Ser. No. 62/566,906, filed on Oct. 2, 2017, the disclosures of which are incorporated herein by reference in their entireties. To the extent appropriate, a claim of priority is made to each of the above disclosed applications.

BACKGROUND

As demand for telecommunications increases, fiber optic networks are being extended in more and more areas. In dense environments, ease of installation, accessibility, and serviceability of the optical fibers within the equipment are important concerns. As a result, there is a need for fiber optic devices which address these and other concerns.

SUMMARY

An aspect of the present disclosure relates to fiber optic circuits, specifically, preformed optical circuits, wherein the fibers are disposed in a predetermined orientation/layout ready for termination to fiber optic connectors. Such fiber optic circuits may be carried within devices, for example, in the form of fiber optic cassettes. Such cassettes may house at least one connector terminated to the preformed circuit that provides a signal entry location and at least one connector terminated to an opposite end of the preformed circuit that provides a signal exit location, wherein the fiber optic circuit is positioned within an interior of the cassette for relaying the signal from the entry location to the exit location. The optical circuits of the present disclosure, as well as the equipment the circuits are housed in, can have many forms. A cassette is simply one example piece of fiber optic equipment for housing such preformed optical circuits.

Another aspect of the present disclosure relates to a method of preparing a preformed fiber optic circuit, the method comprising providing a substrate for supporting a plurality of optical fibers, the substrate including at least one layer of flexible foil and peeling a layer including at least the optical fibers from the at least one layer of flexible foil.

According to another aspect of the disclosure, the preformed fiber optic circuit that is configured for termination to at least one fiber optic connector can include a plurality of optical fibers arranged in a predetermined arrangement, wherein at least a portion of the optical fibers are supported by a layer of flexible foil and at least a portion are coated by a coating including silicone.

According to another aspect of the disclosure, the preformed fiber optic circuit that is configured for termination to at least one fiber optic connector can include a plurality of optical fibers arranged in a predetermined arrangement, wherein at least portion of the optical fibers are supported by a layer of flexible foil, wherein the portion supported by the layer of flexible foil is at least partially coated by a coating including silicone, wherein the plurality of optical fibers also includes at least a portion not supported by a layer of flexible foil and not coated by a coating including silicone.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

DETAILED DESCRIPTION

The present disclosure is directed generally to fiber optic circuits, specifically, preformed optical circuits, wherein the fibers are disposed in a predetermined orientation/layout ready for termination to fiber optic connectors. Such fiber optic circuits may be carried within devices, for example, in the form of fiber optic cassettes that include at least one connector that provides a signal entry location and at least one connector that provides a signal exit location, wherein the fiber optic circuit is positioned thereinbetween for relaying the signal from the entry location to the exit location.

The use of preformed circuits in accordance with the present disclosure can provide a number of advantages. For example, the use of a preformed circuit allows a designer or technician to fix the fibers in a given orientation, wherein the circuit layouts may be produced in a predictable and automated manner. Manual handling and positioning of the fibers within the equipment may be reduced and eliminated through the use of preformed optical circuits. Complexity of the circuits can be increased due to the pre-fixed positioning of the fibers. Termination of the fibers may be facilitated. Methods of the present disclosure that are used to pre-fix the fibers allow the designers to optimize fiber bend radius limits and requirements in configuring the equipment in which they are used, thus, achieving reduced dimensions for the equipment. The bend radius of the fibers can thus be controlled to a minimum diameter.

It should be noted that the optical circuits of the present disclosure, as well as the equipment the circuits are housed in, can have many forms. A cassette is simply one example piece of fiber optic equipment for housing such preformed optical circuits.

Figure 1:
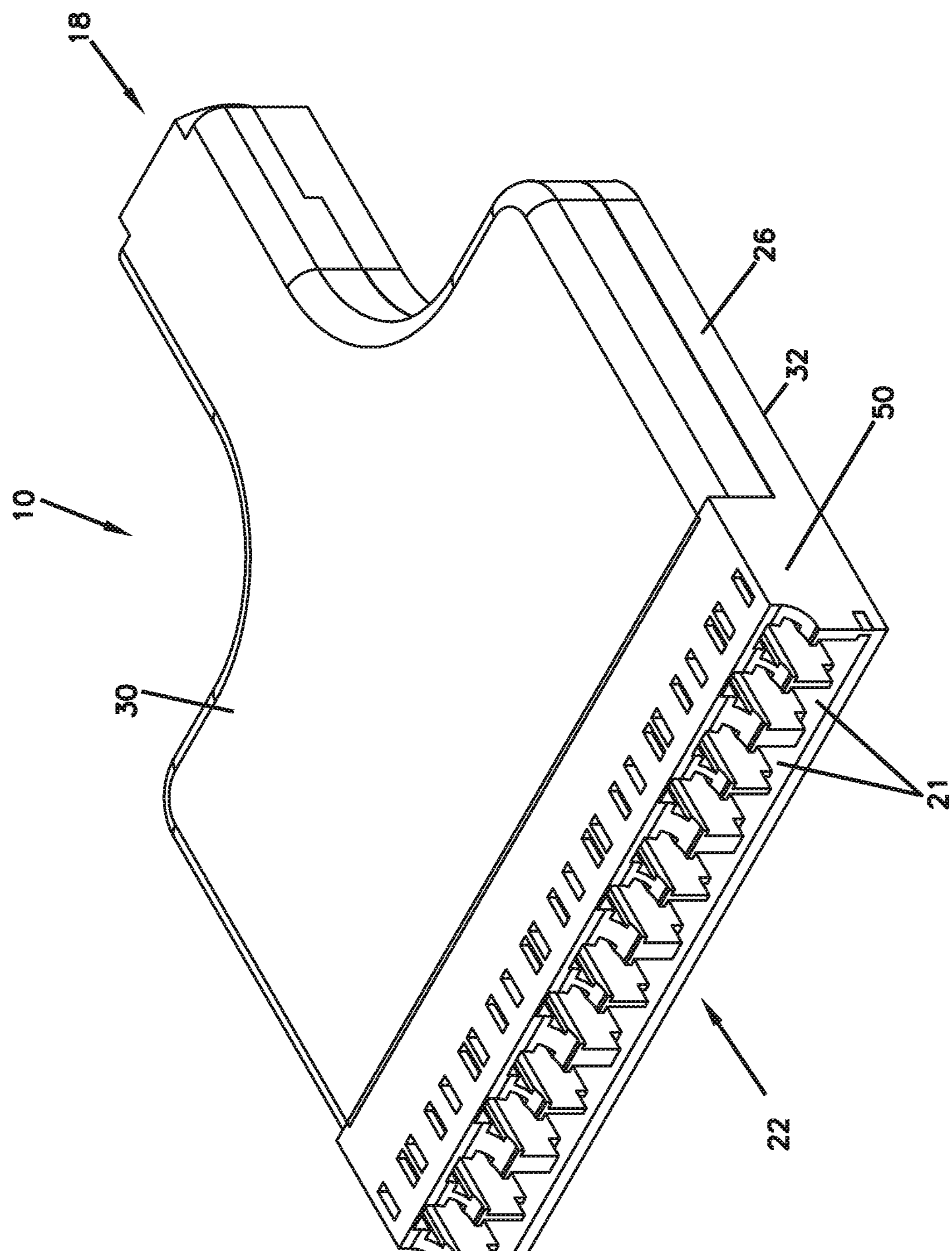
FIG. 1 is a top, front, right side perspective view of an example fiber optic cassette that is shown to house a flexible fiber optic circuit, the fiber optic cassette also being usable with the inventive preformed fiber optic circuits of the present disclosure.
Figure 2:
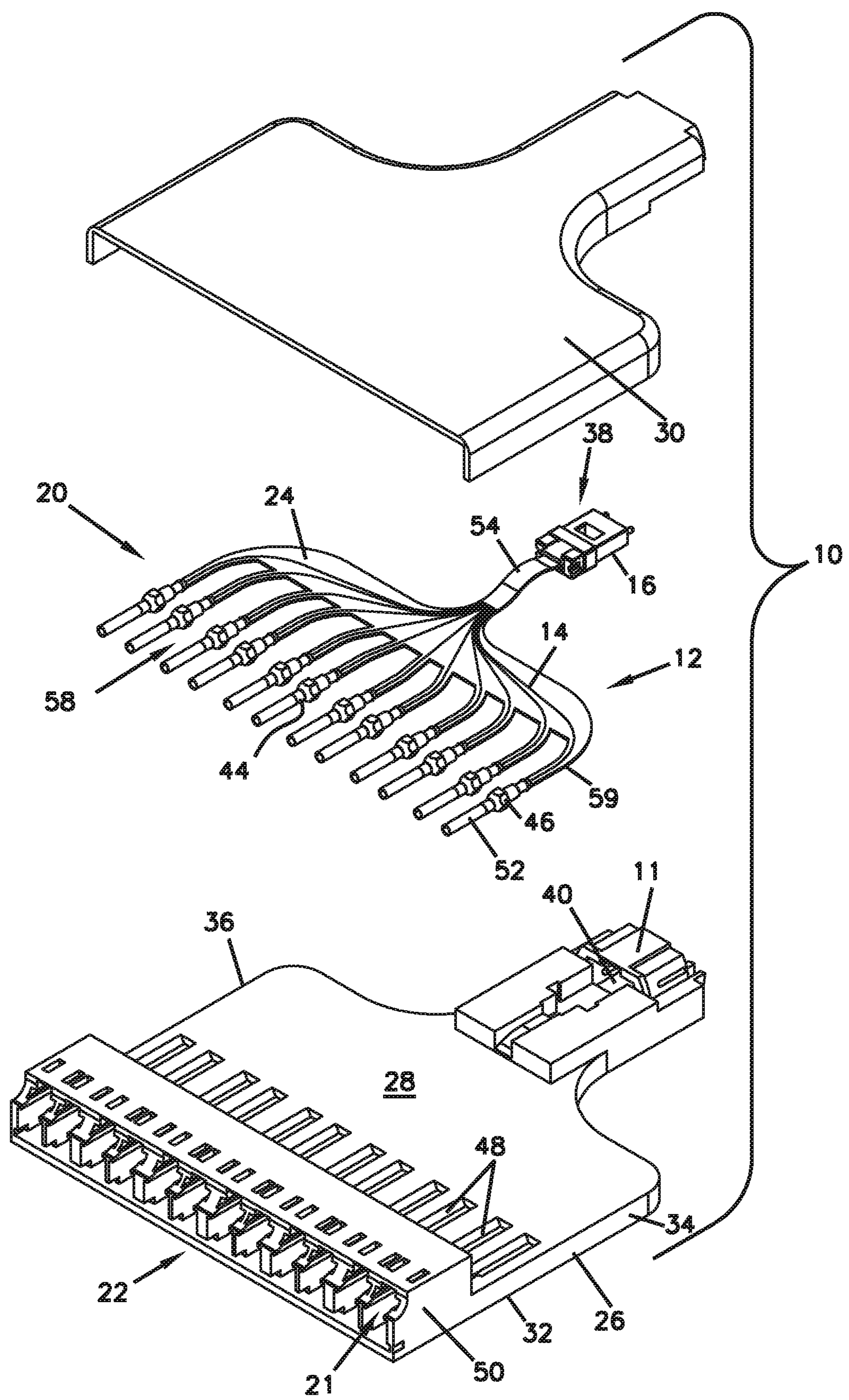
FIG. 2 illustrates the fiber optic cassette of FIG. 1 in an exploded configuration.
Figure 3:
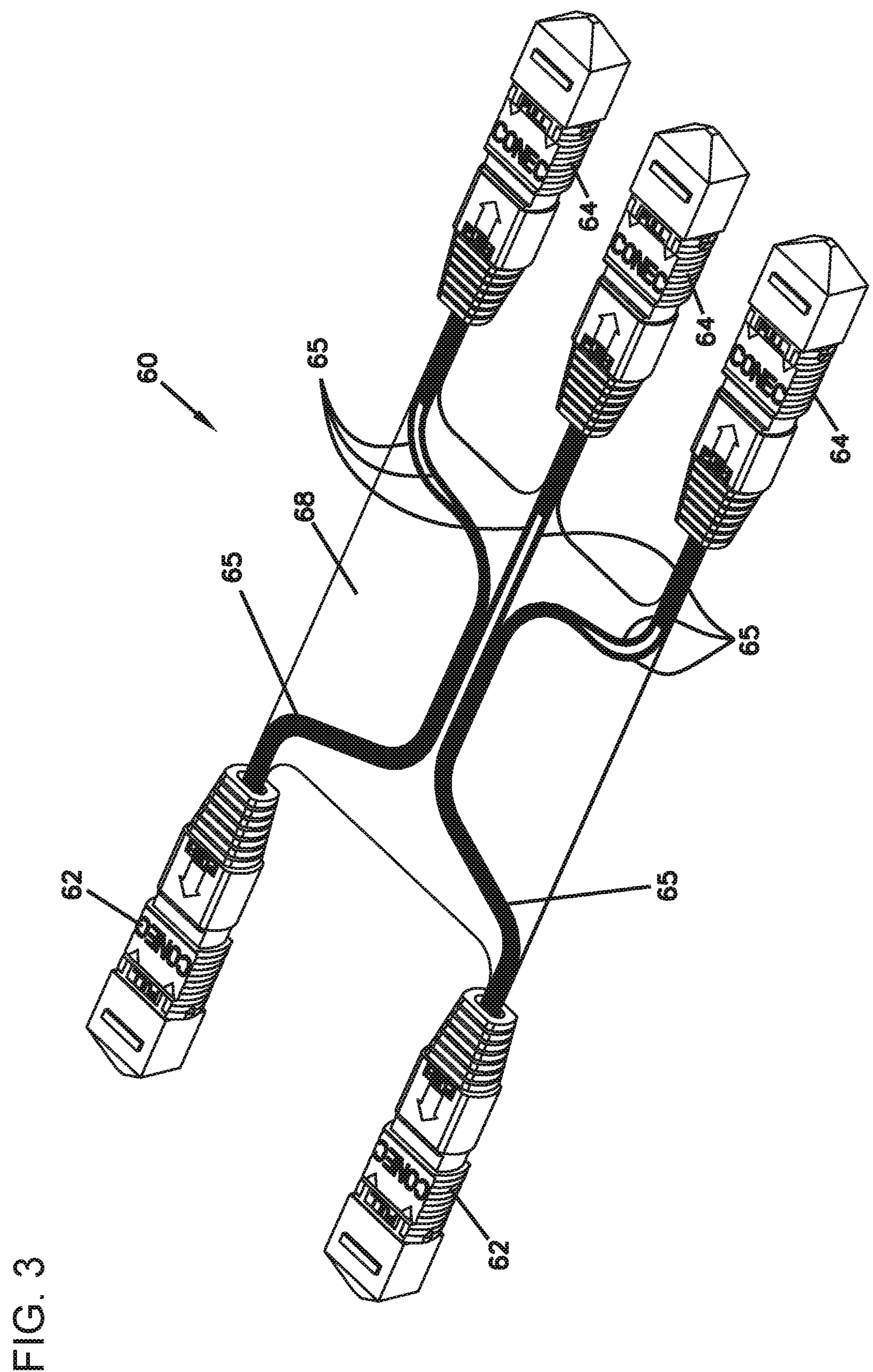
FIG. 3 is a perspective view of an example flexible fiber optic circuit that transitions two multi-fiber connectors to three multi-fiber connectors and that includes dark fibers.
Figure 4:
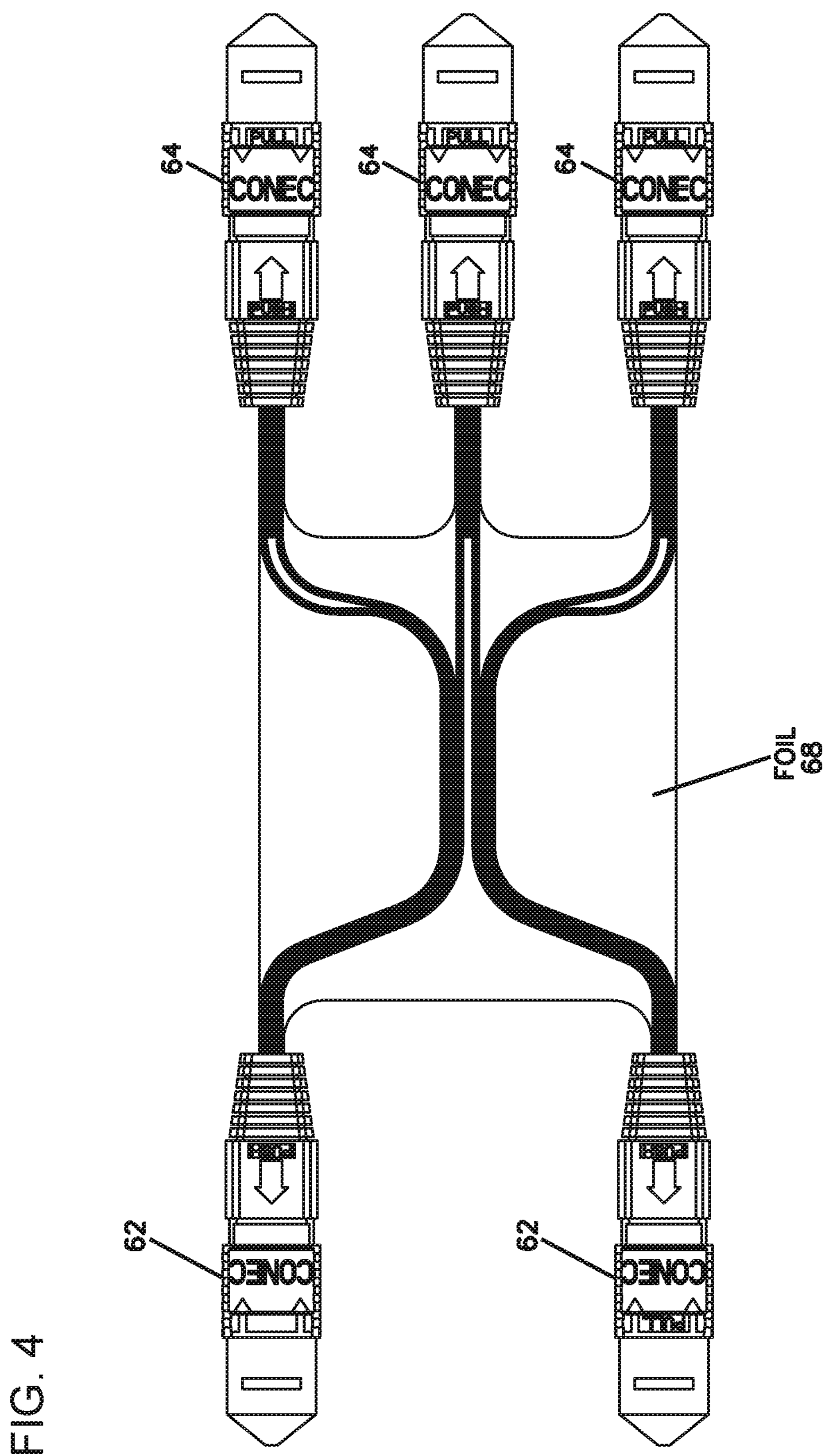
FIG. 4 is a top view of the flexible fiber optic circuit of FIG. 3.

An example of a fiber optic cassette 10 that can utilize the inventive preformed fiber optic circuits of the present disclosure is shown in FIGS. 1-2. In FIG. 2, the cassette 10 is shown with a conventional flexible fiber optic circuit 12. The flexible fiber optic circuit 12 may be replaced with a preformed optical circuit prepared in accordance with the methods of the present disclosure to be discussed in further detail below.

In the fiber optic cassette 10 of FIGS. 1-2, the flexible optical circuit 12 is depicted as transitioning optical fibers 14 between a conventional connector 16 (e.g., an MPO connector) at a rear 18 of the cassette 10 and a plurality of non-conventional connectors 20 at an opposite front end 22 of the cassette 10, wherein portions of a substrate 24 of the flexible optical circuit 12 are physically inserted into the non-conventional connectors 20.

It should be noted that the term "non-conventional connector" may refer to a fiber optic connector that is not of a conventional type such as an LC or SC connector and one that has generally not become a recognizable standard footprint for fiber optic connectivity in the industry.

The elimination of conventional mating connectors inside the cassette 10 may significantly reduce the overall cost by eliminating the skilled labor normally associated with terminating an optical fiber to a connector, including polishing the end face of the fiber and epoxying the fiber into the connector. It further allows the fiber optic interconnect device such as the optical cassette 10 to be made very thin.

Still referring to FIGS. 1-2, the cassette 10 includes a body 26 defining the front 22, the rear 18, and an interior 28. The body 26 further includes a top 30, a bottom 32, and sides 34, 36.

A signal entry location 38 may be provided by the MPO connector 16, which, in the illustrated embodiment, is along the rear 18 of the cassette body 26. A pocket 40 seats an MPO adapter 11 for holding the MPO connector 16. Non-conventional connectors 20 are arranged linearly adjacent the front 22 of the cassette 10. In the depicted embodiment of the cassette 10, the MPO connector 16 of the cassette 10 is positioned to extend generally parallel to ferrules 44 of the non-conventional connectors 20 at the front 22 of the cassette 10.

In general, cassette 10 includes the top 30 and bottom 32 which are generally parallel to each other and define the major surfaces of cassette body 26. Sides 34, 36, front 22, and rear 18 generally define the minor sides of cassette body 26. The cassette 10 can be oriented in any position, so that the top and bottom surfaces can be reversed, or positioned vertically, or at some other orientation.

In the embodiment of the fiber optic cassette 10 shown in FIGS. 1-2, the non-conventional connectors 20 that are positioned adjacent the front 22 of the cassette 10 each define a hub 46 mounted over the ferrule 44. Each ferrule 44 is configured to terminate one of the fibers 14 extending out from the flexible circuit 12.

The non-conventional connectors 20 are placed within pockets 48 provided at a connection block or array 50 located at the front 22 of the cassette 10. A split sleeve 52 is also provided for ferrule alignment between the hub 46 and ferrule 44 of each non-conventional connector 20 and the ferrule of another mating connector that enters the cassette 10 from the front 22.

The mating connectors entering the cassette 10 from the front 22 of the cassette 10 may be connected through fiber optic adapters 21 that are mounted on the connection block 50. The adapters 21 at the front 22 of the cassette 10 allow conventional connectors such as LC connectors to be mated to the non-conventional connectors 20 located within the interior 28 of the cassette 10. Such adapters or adapter blocks may be snap-fit, ultrasonically welded, or otherwise attached to the rest of the cassette body 26. In the illustrated embodiment of the cassette 10 of FIGS. 1-2, the adapters that would be used with the cassette 10 are sized to receive mating LC connectors.

The cassette 10 of FIGS. 1-2 can be sealed or can be openable, so as to allow repair, or cleaning of the inner hubs 46 and ferrules 44. The flexible fiber optic circuit 12 may allow the entire fiber bundle, including the MPO connector 16 to be able to be removed for cleaning or replacement.

The fiber pigtails 14 extending out from a rear end 54 of the substrate 24 forming the flexible optical circuit 12 may be terminated to an MT ferrule of the MPO connector 16. The fiber pigtails 14 extending out from a front end 58 of the substrate 24 are individually terminated to the ferrules 44 to be positioned at the front 22 of the cassette 10. As shown, the substrate 24 defines front extensions 59 (one per fiber 14) each provided in a spaced apart configuration for providing some flexibility to the substrate 24.

The individual fibers 14 are separated out from the ribbonized section at the rear 54 of the substrate 24 and are routed through the substrate 24 to the individual front extensions 59. By using a rigid substrate, when the fibers are being terminated to the ferrules 44, the ends of the fibers may be cleaved and ends of all of the ferrules 44 extending from the substrate 24 may be polished simultaneously.

As noted above, the cassette of FIGS. 1-2 is simply one example of a fiber optic cassette that can utilize the inventive preformed fiber optic circuits of the present disclosure. The flexible fiber optic circuit 12 of the cassette 10 may be replaced with a preformed optical circuit prepared in accordance with the methods of the present disclosure to be discussed in further detail below.

Referring now to FIGS. 3-6, another example of a conventional flexible fiber optic circuit 60 that transitions two multi-fiber connectors 62 to three multi-fiber connectors 64 and that includes dark fibers 66 is illustrated. It should be noted that such a flexible circuit is another example of a fiber circuit that can be replaced with a preformed optical circuit prepared in accordance with the methods of the present disclosure to be discussed in further detail below.

Still referring to FIGS. 3-6, in the illustrated example, a flex foil 68 is shown with multiple connectors 62, 64 connected to various fibers 65 organized and supported by the foil 68. As shown, not all of the fibers 65 provided carry signals. Specifically, on the side of the foil 68 with three connectors 64, only eight of the twelve fibers 65 carry signals, and the middle four, are dark fibers 66. If such unused fibers 66 were not present, there is a chance the multi-fiber ferrule could become damaged during polishing.

Figure 5:
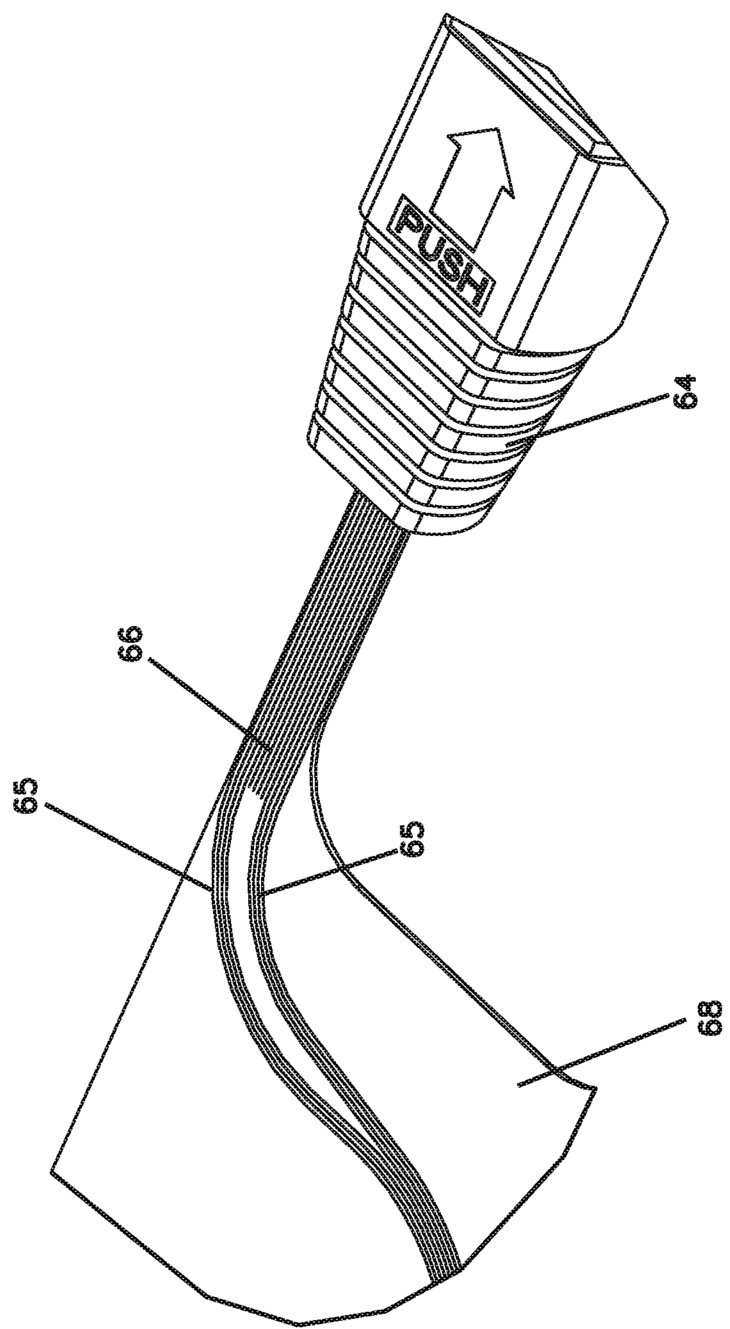
FIG. 5 is an enlarged view of a portion of the flexible fiber optic circuit of FIG. 3, showing the placement of the dark fibers.
Figure 6:
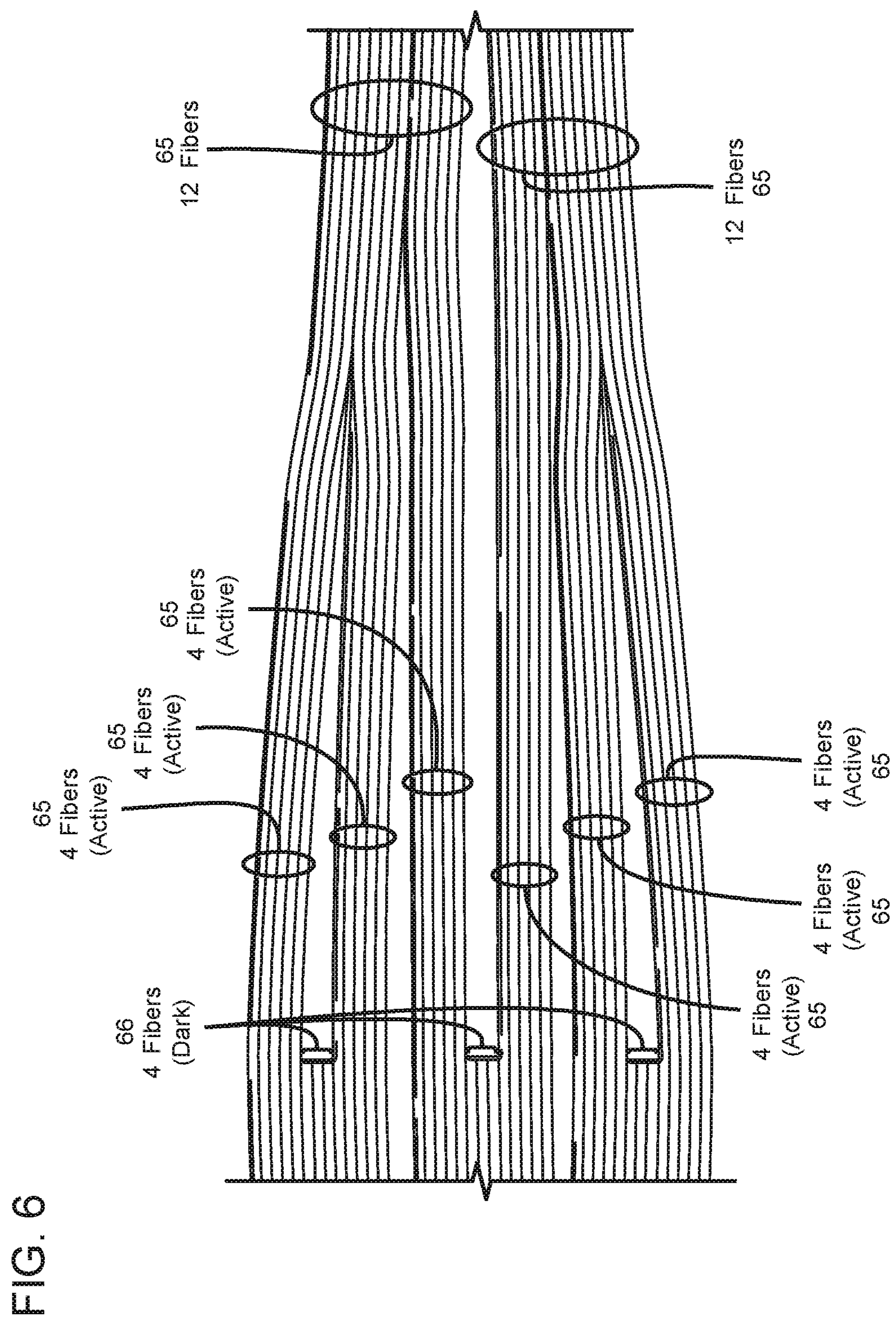
FIG. 6 shows another close up view of an example circuit transitioning fibers from two twelve-fiber connectors to three twelve-fiber connectors, further illustrating the dark fibers.

FIGS. 5-6 specifically provides close-up views illustrating the dark fibers 66 in the transition from the two twelve-fiber connectors 62 to three twelve-fiber connectors 64.

A fiber optic circuit such as the circuit 60 shown in FIGS. 3-6 can be utilized in a piece of fiber optic equipment such as a cassette similar to the cassette 10 of FIGS. 1-2 if the cassette is configured accordingly.

Figure 7:
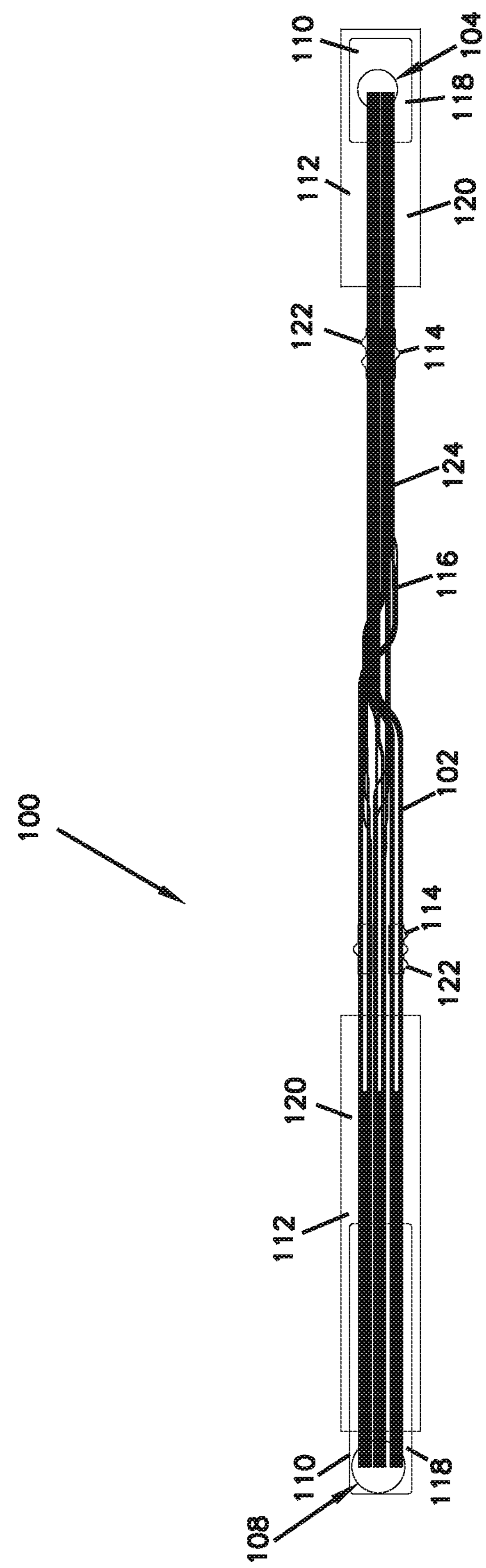
FIG. 7 illustrates an example of a preformed fiber optic circuit transitioning two sets of twelve fibers to three sets of eight fibers, the preformed circuit having features that are examples of inventive aspects in accordance with the present disclosure, wherein the preformed fiber optic circuit can be utilized within a fiber optic cassette such as that shown in FIGS. 1-2.
Figure 8:
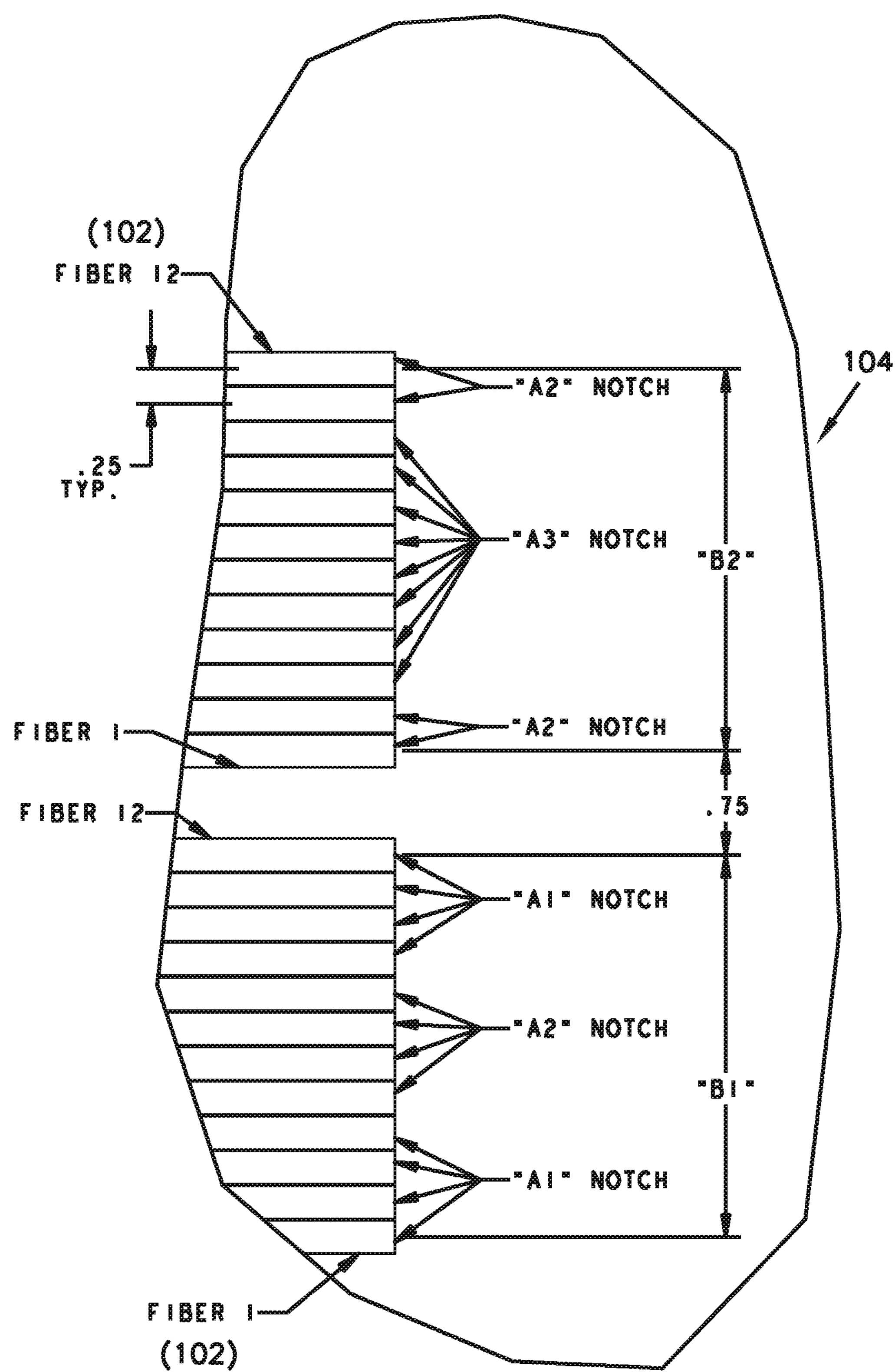
FIG. 8 shows an enlarged view of a first end of the preformed fiber optic circuit of FIG. 7, illustrating the two sets of twelve fibers that are to be terminated to two multi-fiber connectors.
Figure 9:
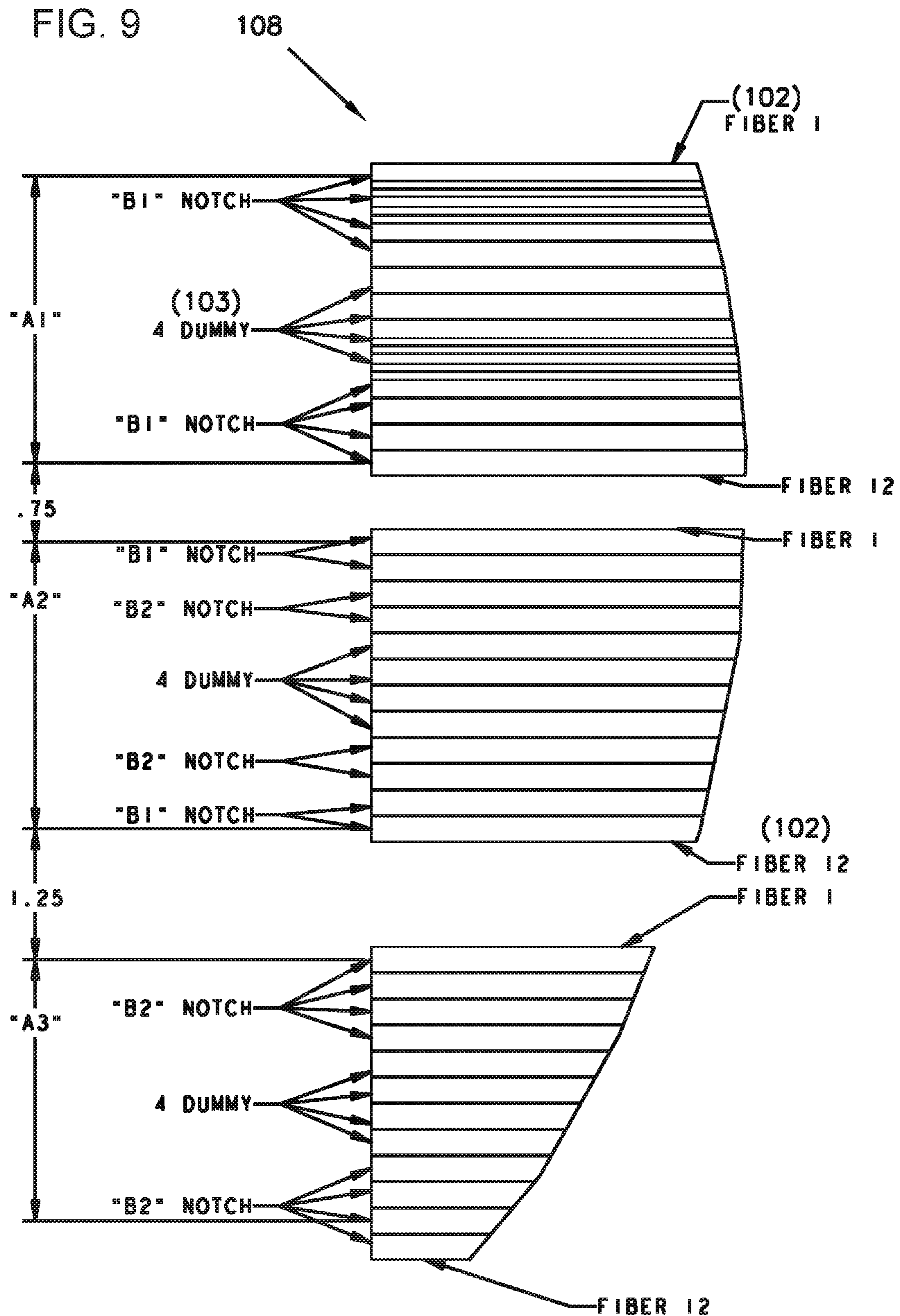
FIG. 9 shows an enlarged view of a second end of the preformed fiber optic circuit of FIG. 7, illustrating the three sets of twelve fibers that are to be terminated to three multi-fiber connectors, wherein four of the fibers for each multi-fiber connector are dummy or dark fibers, resulting in eight active fibers for each of the three multi-fiber connectors.

Referring now to FIGS. 7-9, an example of a preformed fiber optic circuit 100 transitioning two sets of twelve fibers 102 to three sets of eight fibers 102, the preformed circuit 100 having features that are examples of inventive aspects in accordance with the present disclosure, is illustrated. The preformed fiber optic circuit 100 can essentially replace the circuit 60 illustrated in FIGS. 3-6 and can be prepared in accordance with the methods of the present disclosure to be discussed in further detail below. As noted above, the preformed fiber optic circuit 100 of FIGS. 7-9 can be utilized within a fiber optic cassette such as the cassette 10 shown in FIGS. 1-2.

FIG. 8 shows an enlarged view of a first end 104 of the preformed fiber optic circuit 100 of FIG. 7, illustrating the two sets of twelve fibers 102 that are to be terminated to two multi-fiber connectors, and FIG. 9 shows an enlarged view of a second end 108 of the preformed fiber optic circuit 100 of FIG. 7, illustrating the three sets of twelve fibers 102 that are to be terminated to three multi-fiber connectors, wherein four of the fibers 102 for each multi-fiber connector are dummy or dark fibers 103, resulting in eight active fibers 102 for each of the three multi-fiber connectors.

Figure 10:
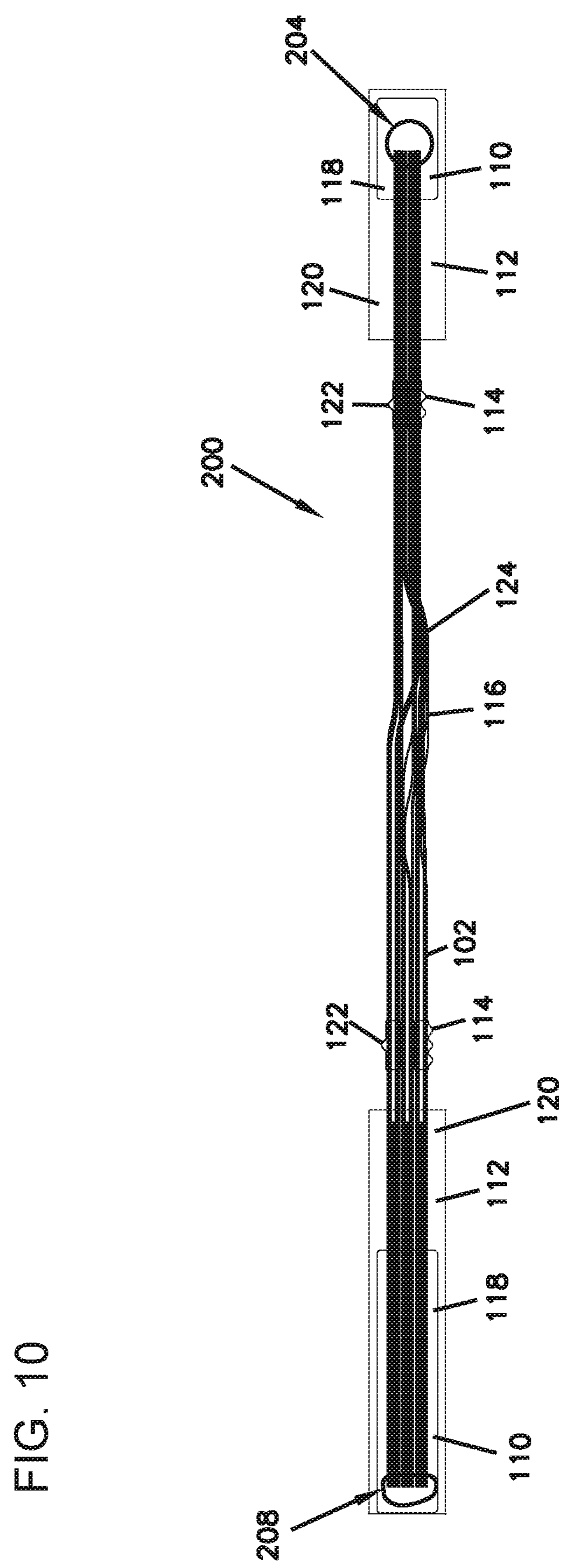
FIG. 10 illustrates another example of a preformed fiber optic circuit similar to that shown in FIGS. 7-9, but transitioning twenty-four fibers to three sets of eight fibers, the preformed circuit having features that are examples of inventive aspects in accordance with the present disclosure, wherein the preformed fiber optic circuit can be utilized within a fiber optic cassette such as that shown in FIGS. 1-2.
Figure 11:
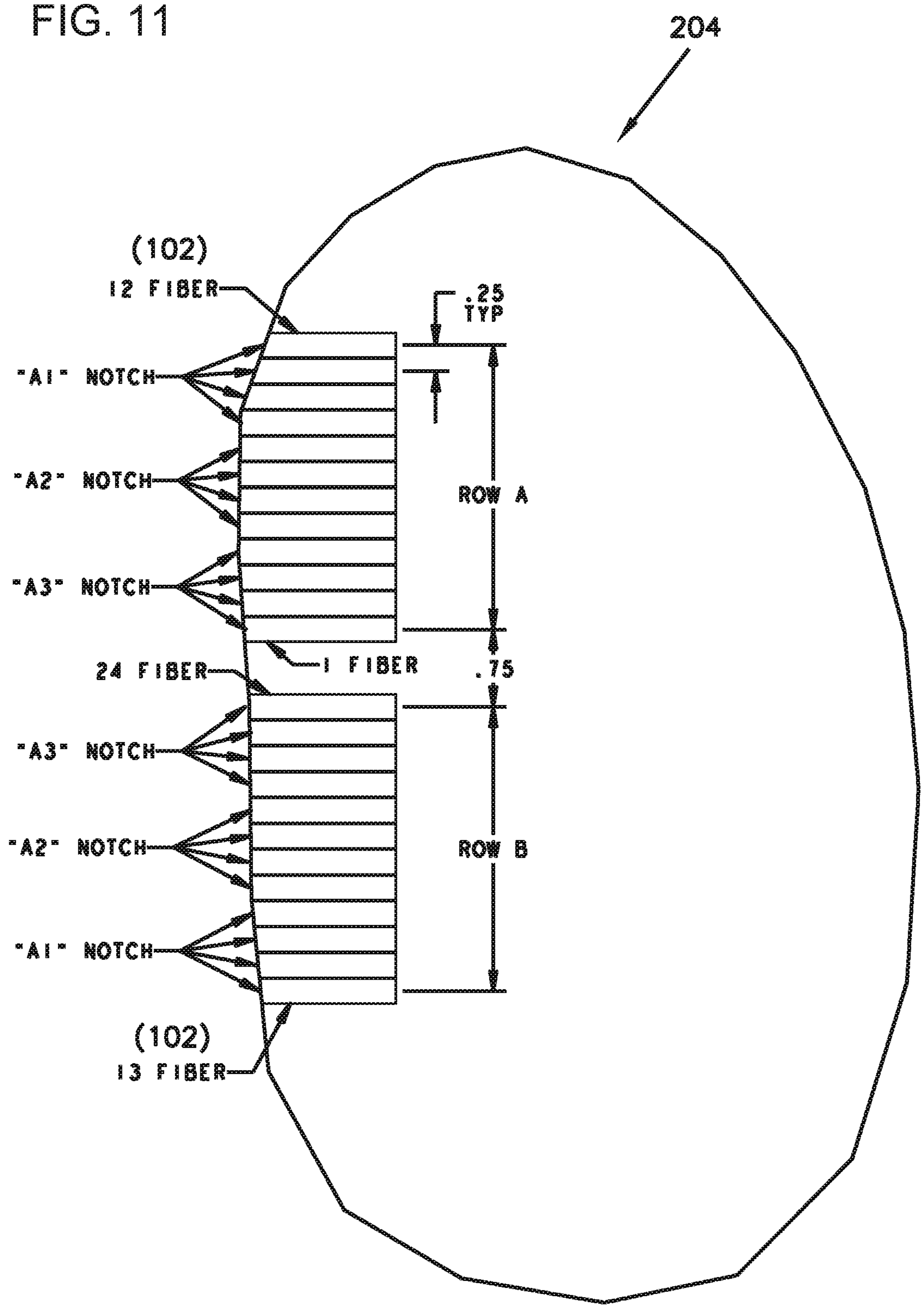
FIG. 11 shows an enlarged view of a first end of the preformed fiber optic circuit of FIG. 10, illustrating the twenty-four fibers that are to be terminated to a multi-fiber connector.
Figure 12:
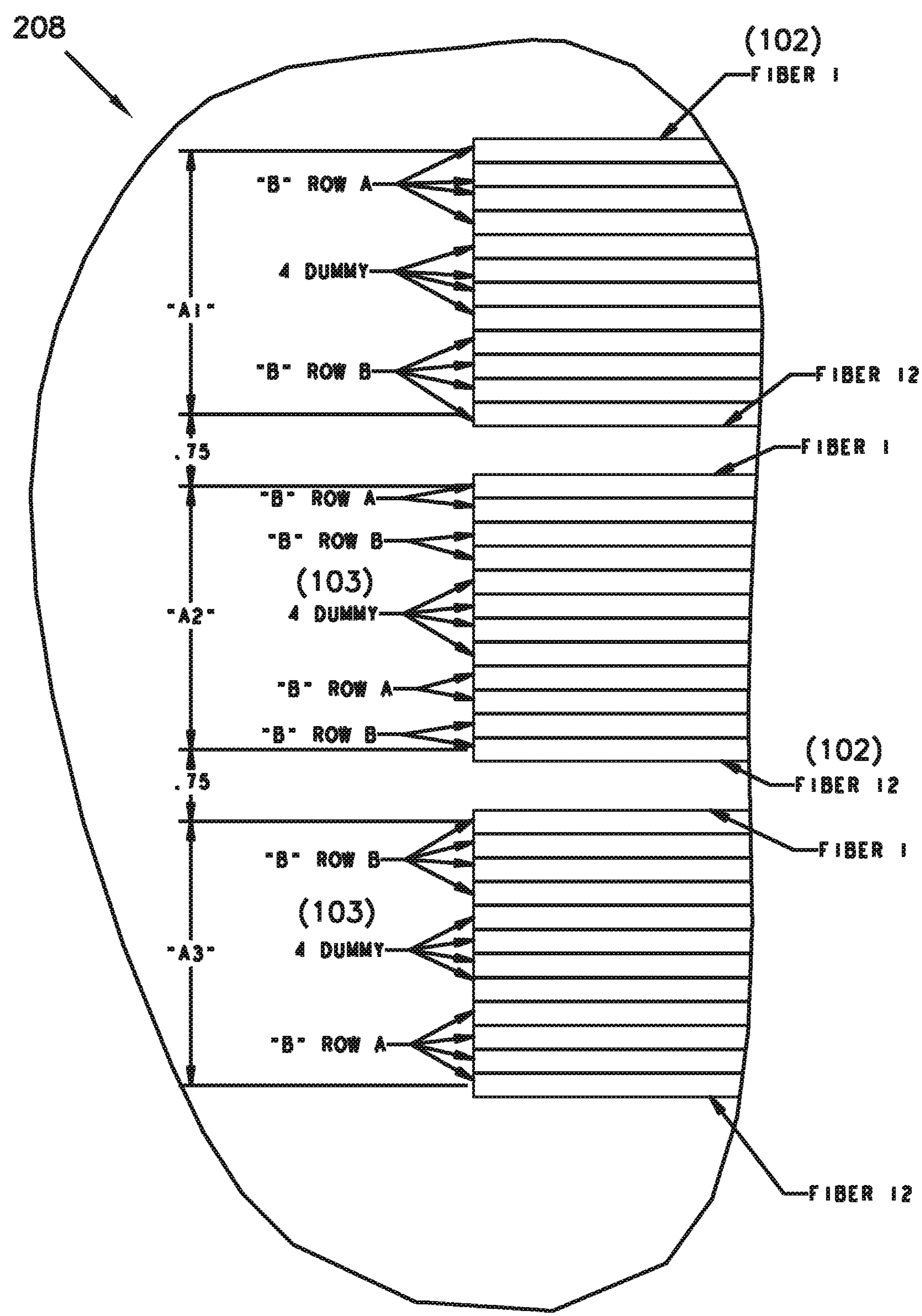
FIG. 12 shows an enlarged view of a second end of the preformed fiber optic circuit of FIG. 10, illustrating the three sets of twelve fibers that are to be terminated to three multi-fiber connectors, wherein four of the fibers for each multi-fiber connector are dummy or dark fibers, resulting in eight active fibers for each of the three multi-fiber connectors.

Referring now to FIGS. 10-12, another example of a preformed fiber optic circuit 200 similar to that shown in FIGS. 7-9, but transitioning twenty-four fibers 102 to three sets of eight fibers 102, the preformed circuit 200 having features that are examples of inventive aspects in accordance with the present disclosure, is illustrated. As noted above, the preformed fiber optic circuit 200 of FIGS. 10-12 can be utilized within a fiber optic cassette such as the cassette 10 shown in FIGS. 1-2.

FIG. 11 shows an enlarged view of a first end 204 of the preformed fiber optic circuit 200 of FIG. 10, illustrating the twenty-four fibers 102 that are to be terminated to a multi-fiber connector, and FIG. 12 shows an enlarged view of a second end 208 of the preformed fiber optic circuit 200 of FIG. 10, illustrating the three sets of twelve fibers 102 that are to be terminated to three multi-fiber connectors, wherein four of the fibers for each multi-fiber connector are dummy or dark fibers 103, resulting in eight active fibers 102 for each of the three multi-fiber connectors.

Each of the preformed fiber optic circuits (100 of FIGS. 7-9 and 200 of FIGS. 10-12) includes a first portion 110, a second portion 112, a third portion 114, and a fourth portion 116. The first portion 110 can be referred to as a flex foil portion 118. The second portion 112 can be referred to as a ribbon portion 120. The third portion 114 can be referred to as an identification flag portion 122. And, the fourth portion 116 can be referred to as a stranded fiber portion 124. It should be noted that the two ends of the preformed fiber optic circuits may be configured in a similar manner since both ends are to be terminated to fiber optic connectors. The stranded fiber portion 124 may be located adjacent the middle of the preformed circuit as shown.

The methods discussed herein with respect to FIGS. 13-24 specifically detail the steps used in preparing the first-fourth portions 110, 112, 114, 116 of the preformed optical circuit 100. Similar steps are applicable to other preformed optical circuits similar in configuration, such as circuit 200.

Figure 20:
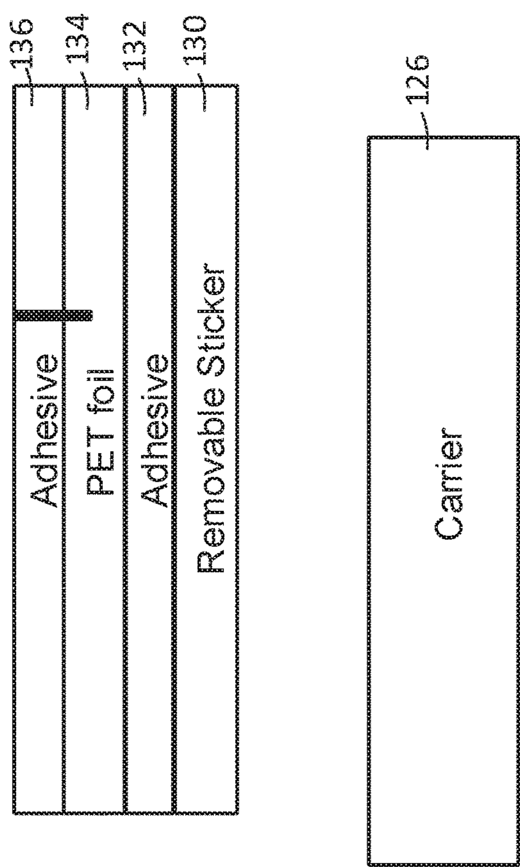
Figure 21:
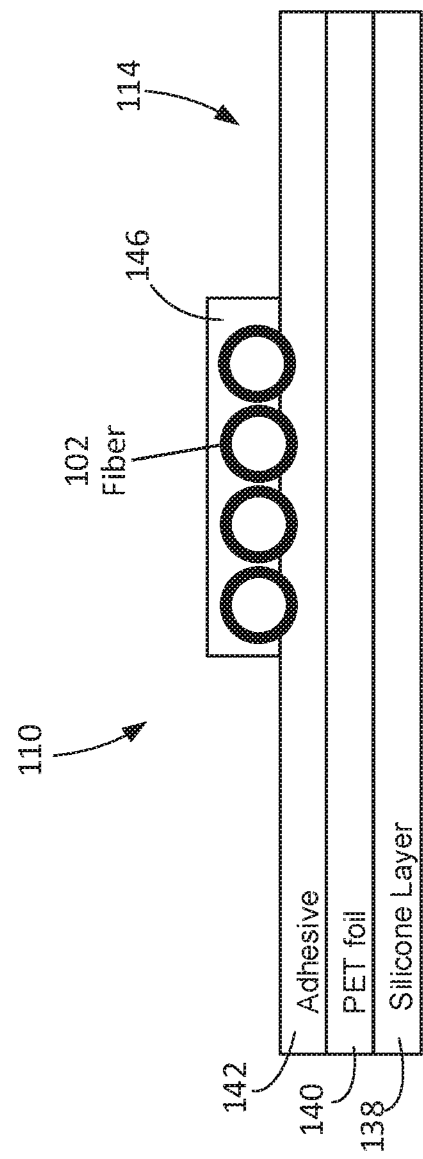
FIG. 21 illustrates at least a portion of the preformed fiber optic circuit prepared in accordance with the method illustrated in FIGS. 13-20, wherein the portion includes a plurality of fibers in a predetermined arrangement supported by a layer of polyethylene terephthalate (PET) foil and coated by a silicone coating.
Figure 22:
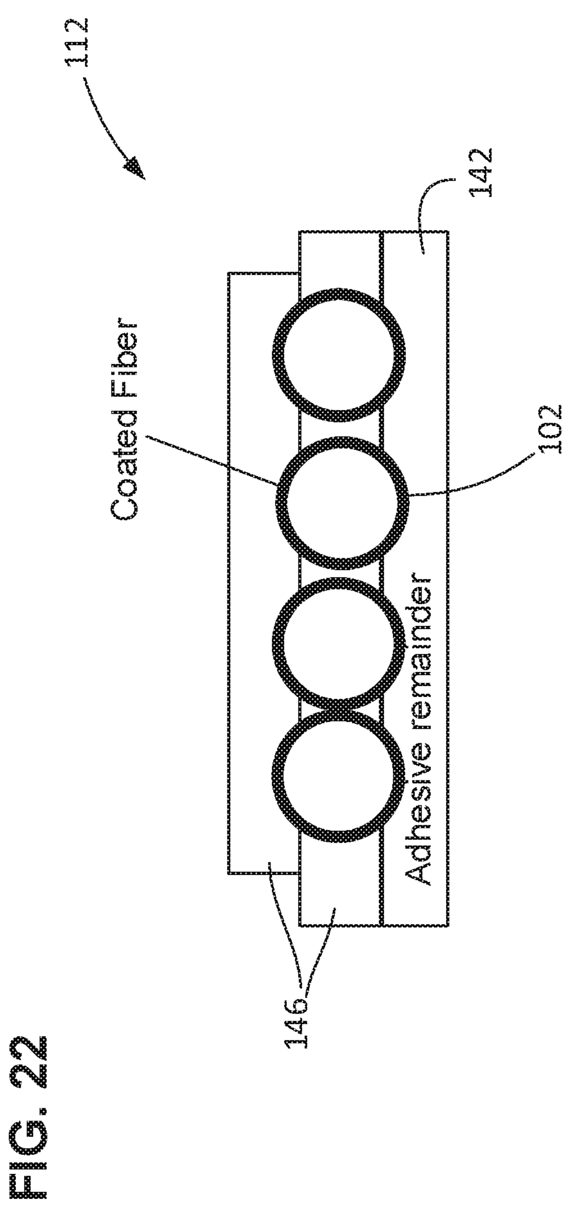
FIG. 22 illustrates at least a portion of the preformed fiber optic circuit prepared in accordance with the method illustrated in FIGS. 13-20, wherein the portion includes a plurality of fibers in a predetermined arrangement coated by a silicone coating.

While FIGS. 13-20 specifically detail the methodology used in preparing the different portions of the preformed fiber optic circuit 100, FIG. 21 specifically illustrates the final configuration of the first portion 110 and the third portion 114 of the preformed fiber optic circuit 100. FIG. 22 specifically illustrates the final configuration of the second portion 112 of the preformed fiber optic circuit 100. And, FIG. 24 specifically illustrates the final configuration of the fourth portion 116 of the preformed fiber optic circuit 100, wherein the stranded fibers 102 are removed from a flexible foil layer 140 and are left as bare fibers 102.

As will be described in further detail below, according to one example embodiment, the flexible foil layer 140 for supporting the fibers 102 may be formed from polyethylene terephthalate (PET). However, it should be understood that PET is simply one non-limiting example polymer that may be used to form the flexible foil of the present disclosure, and other polymers having similar characteristics and that are able to at least semi-rigidly support the fibers in a predetermined orientation are also usable in accordance with the inventive concepts of the present disclosure.

After the preformed fiber circuits 100, 200 of FIGS. 7-9 and 10-12 are prepared in accordance with the methods outlined in FIGS. 13-20, the flex foil portion 118 of the circuit 100/200 is completely removed by a cut that is made at the ribbon portion 120 of the circuit 100/200 between the identification flag portion 122 and the flex foil portion 118. Once the ends of the fibers 102 are prepared at the ribbon portion 120 by cleaving and polishing, the ends are ready to be terminated to a fiber optic connector. The identification flag portion 122 may be left in place as a marker in correctly orienting the fibers 102 from one end of a piece of equipment to an opposite end. The stranded fiber portion 124 is also left as a bare fiber 102. Both of the opposing ends of the preformed fiber optic circuit 100/200 are processed in the same manner as just described.

It should be noted that in certain instances, instead of termination to the ferrules of the fiber optic connectors, the ribbon portion 120 (or even the stranded fiber portion 124) may be connected to other ribbons or connector (multi-fiber/simplex) stub fibers via a splicing operation.

Now referring to FIGS. 13-24, the preparation of the exemplary preformed fiber optic circuits 100/200, including the four different portions 110, 112, 114, 116 is detailed herein.

Figure 13:
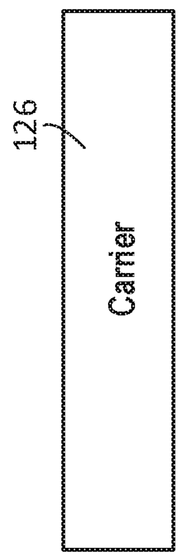

Referring specifically to FIG. 13, a carrier 126 is used to initially support the preformed fiber circuit 100 (or 200) of the present disclosure. According to one example embodiment, the carrier 126 may be a plate with a siliconized top layer and may be provided as part of a piece of equipment or machine that is conventionally used in forming flexible fiber optic circuits.

Figure 14:
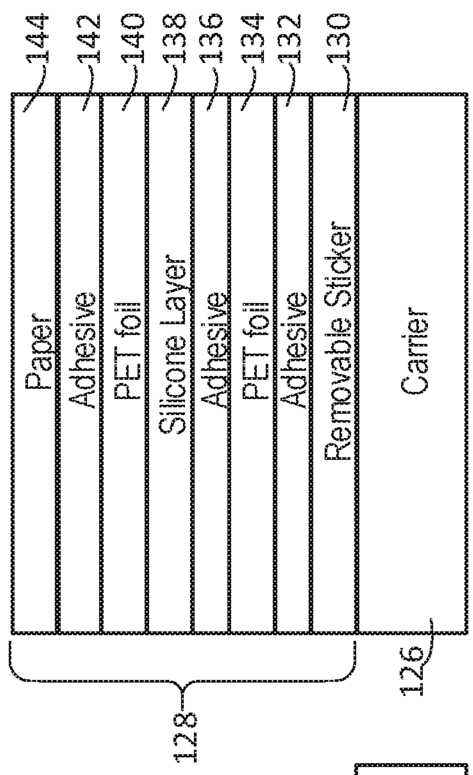
FIGS. 13-20 illustrate an example method of forming the preformed fiber optic circuits of the present disclosure, the method having features that are examples of inventive aspects in accordance with the present disclosure, the method of FIGS. 13-20 usable in forming the example circuits illustrated in FIGS. 7-12.

Referring to FIG. 14, as seen in the diagrammatic view, a substrate 128 including two layers of flexible foil (e.g., PET foil) is provided for initially supporting the preformed fiber optic circuit 100. The two layers of PET foil are stacked and separated by adhesives.

As seen in FIG. 14, when viewed at a transverse cross-section, starting from the bottom carrier 126, the substrate 128 includes a removable sticker layer 130, a first adhesive layer 132, a first layer of PET foil 134, a second adhesive layer 136, a silicone layer 138, a second layer of PET foil 140, a third adhesive layer 142, and a final paper layer 144.

According to example embodiments, the removable sticker layer 130 may be a polyethylene copolymer (PE) layer with an adhesive coating for removability from the carrier 126. In certain embodiments, the removable sticker 130 may have a thickness of around 0.07 millimeters (mm). The first layer of PET foil 134, as seen, is surrounded by the two adhesive layers 132, 136. The second layer of PET foil 140 may be around 0.05 mm in thickness and have a siliconized side 138 to facilitate release. The third adhesive layer 142 that is on the second layer of PET foil 140 may be an acrylic 200MP adhesive having a thickness of around 0.13 mm. The top paper layer 144 may be a Polycoated Kraft Paper (PCK) having a thickness of around 0.11 mm.

Figure 15:
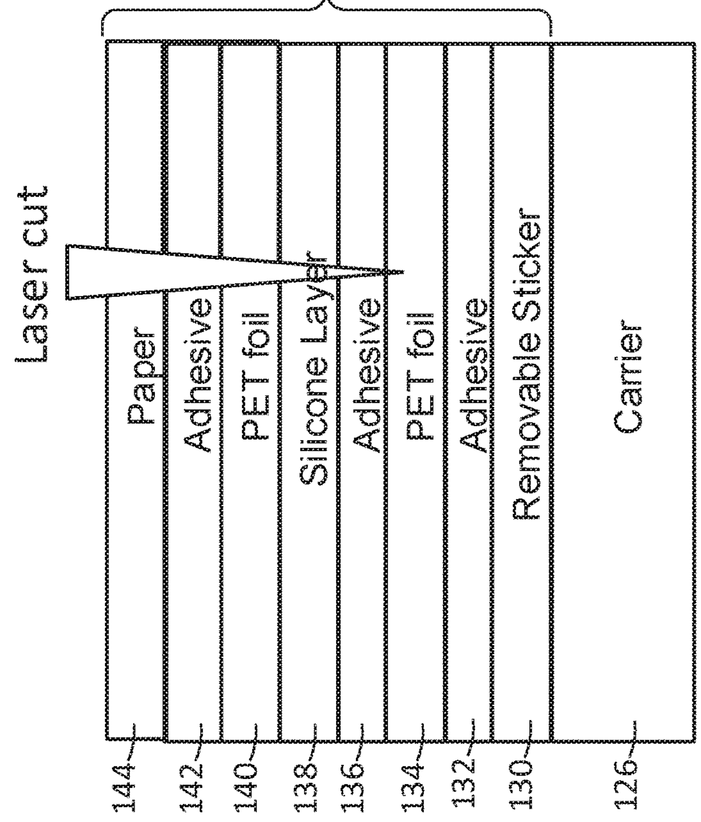

Now referring to FIG. 15, as the next step in the process, a pattern is cut into the top PET foil layer 140 with, for example, a $CO_2$ laser. The cut may extend to the first PET foil layer 134 as shown in FIG. 15. It should be noted that the minimum cut depth preferably extends past the siliconized side 138 of the top PET foil layer 140 to the second adhesive layer 136. And, the maximum cut depth preferably extends past the adhesive 132 at the underside of the first PET foil 134 to the removable sticker layer 130.

As will be described in further detail, the minimum cut depth is set for facilitating removal or peeling of the top PET foil layer 140 for preparing the preformed fiber optic circuit 100 of the present disclosure. The maximum cut depth is set for facilitating removal or peeling of the lower PET foil layer 134 and sticker 130 from the reusable carrier 126, where the lower PET foil layer 134 and the sticker 130 are discharged, as will be discussed.

Figure 16:
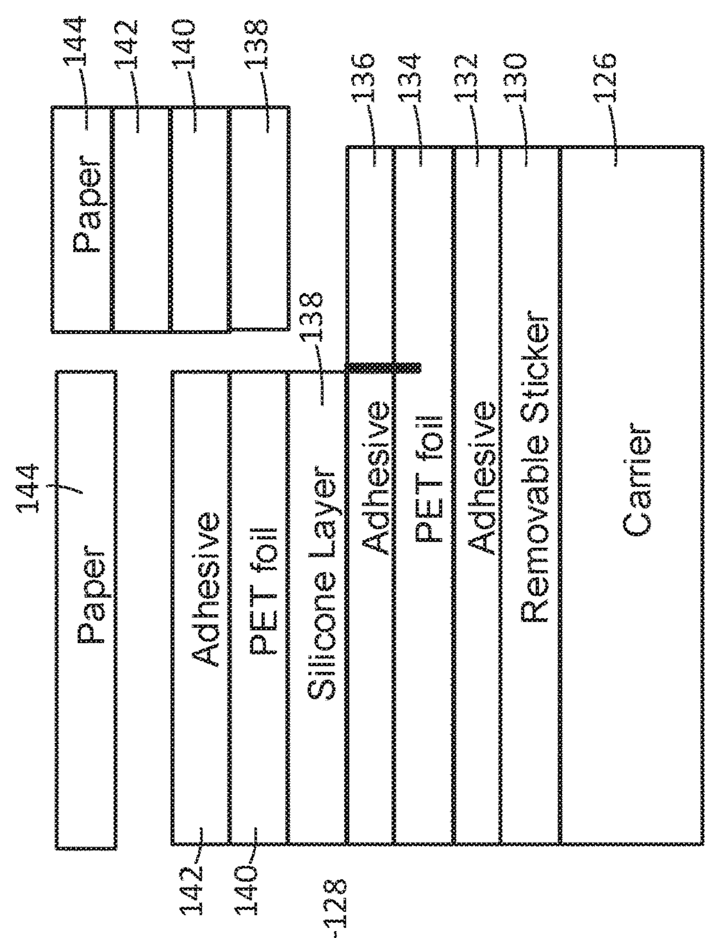

Referring now to FIG. 16, the laser-cut top PET foil layer 140 portions (including the silicone layer 138, the top PET foil layer 140, the third adhesive layer 142, and the paper layer 144) are removed. The uncut portions remain on the substrate 128 as shown. The top paper layer 144 is removed from the entire substrate 128 leaving exposed the third adhesive layer 142 as the top layer on the remaining substrate 128.

Figure 17:
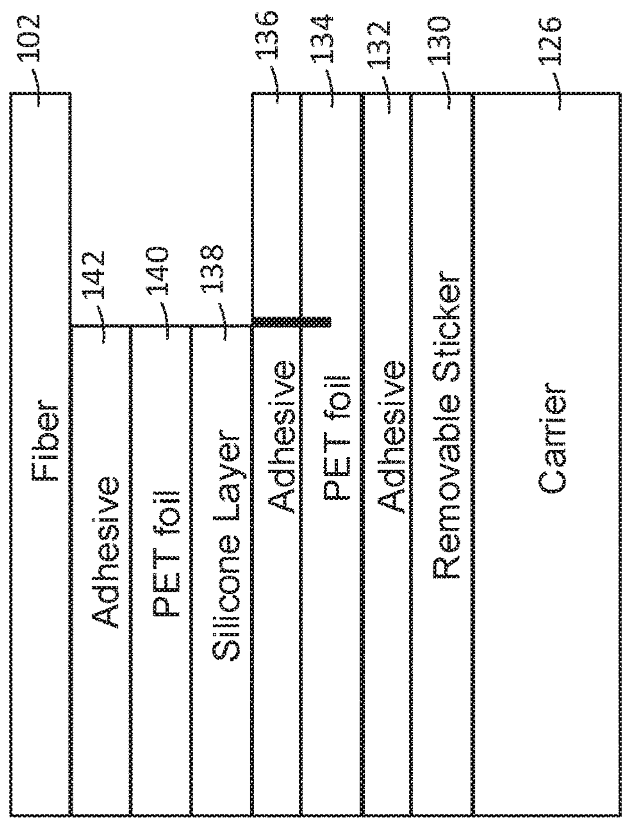

Referring now to FIG. 17, optical fibers 102 (e.g., 0.25 mm fibers) are routed onto the substrate 128 and are held in place by the top adhesive layer 142 and the second adhesive layer 136.

Figure 18:
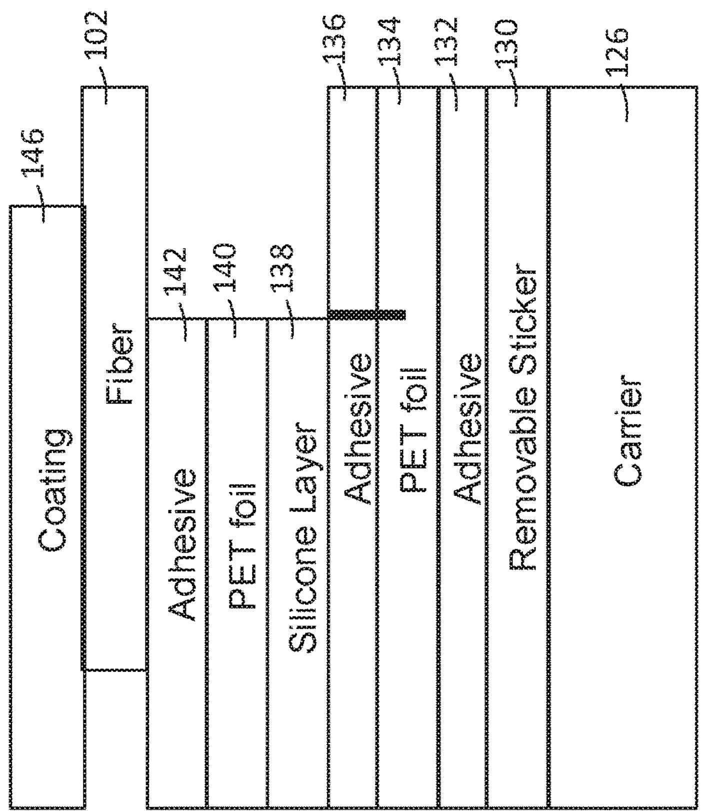

Referring now to FIG. 18, an optional conformal silicone coating 146 may be applied to the fibers 102 at the desired portions of the circuit as will be discussed in further detail below. The silicone coating 146, where applied, is used to supplement the top adhesive layer 142 to fix the fibers 102 onto the top PET foil 140 and to cover the top adhesive layer 142 to limit tackiness.

Figure 19:
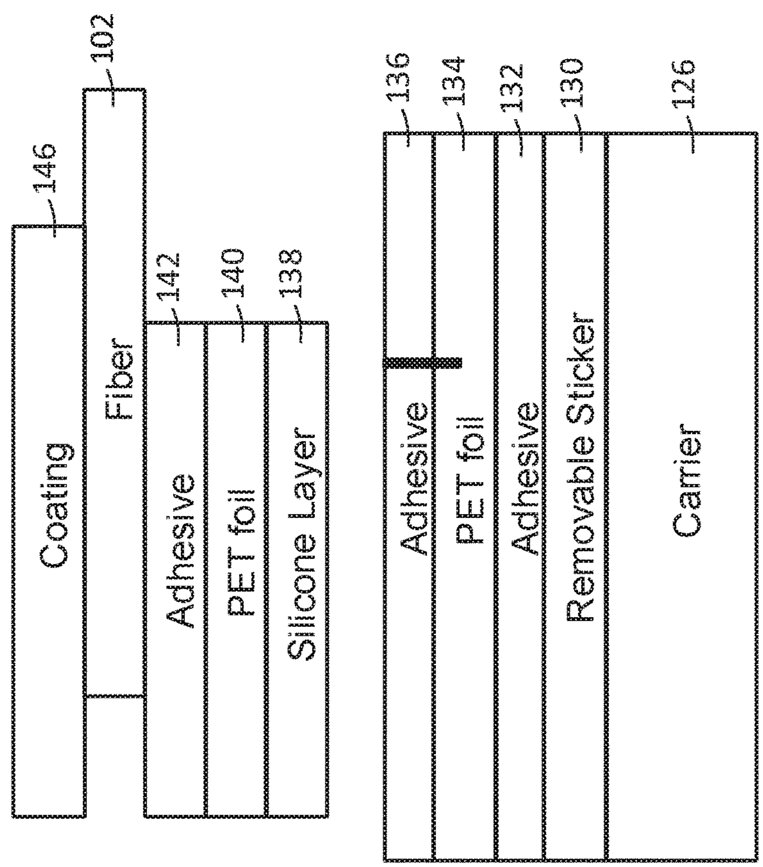

Referring now to FIG. 19, as the next step, the fibers 102 with the top PET foil layer 140 and the silicone coating 146 (if applied) are removed or peeled from the carrier 126 and may form a portion of the preformed fiber optic circuit of the present disclosure.

Referring to FIG. 20, the bottom PET foil layer 134 surrounded by the first and second adhesive layers 132, 136 and the removable sticker layer 130 are removed from the carrier 126 and discarded. As noted above, the carrier 126 with the siliconized surface may be part of a piece of machine or equipment and may be reusable for this process.

FIG. 21 specifically illustrates the final configuration of the first portion 110 and the third portion 114 of the preformed fiber optic circuit 100. As noted previously, the first portion 110 can be referred to as the flex foil portion 118 and the third portion 114 can be referred to as the identification flag portion 122. These first and third portions 110, 114 are illustrated in the preformed fiber optic circuits 100, 200 of FIGS. 7 and 10. The flex foil portion 118 and the identification flag portion 122 both include the silicone coated fibers 102 that are supported by the top PET foil layer 140, wherein the third adhesive layer 142 and the silicone layer 138 surround opposite sides of the PET foil layer 140.

FIG. 22 specifically illustrates the final configuration of the second portion 112 of the preformed fiber optic circuit 100. As noted previously, the second portion 112 can be referred to as the ribbon portion 120. The ribbon portion 120 includes the silicone coated fibers 102 with the remaining top adhesive layer 142. The silicone coating 146 may interact with the adhesive layer 142, and the combination may result in a layer having a thickness of around 0.15-0.20 mm. As shown, the ribbon portion 120 does not include the top PET foil layer 140, which is removed in the process. This process provides a unique and novel method of forming ribbonized fiber.

Figure 24:
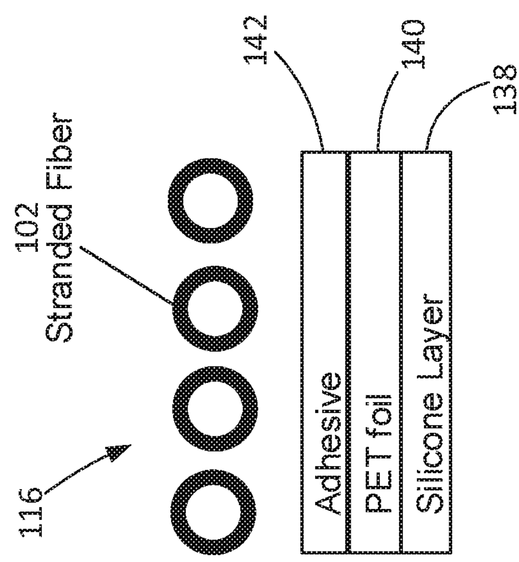
FIG. 24 illustrates at least a portion of the preformed fiber optic circuit prepared in accordance with the method illustrated in FIGS. 13-20, wherein the portion includes the uncoated bare fibers separated from the PET foil of FIG. 23.
Figure 23:
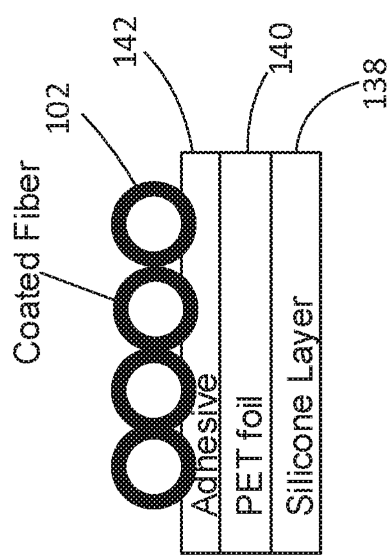
FIG. 23 illustrates at least a portion of the preformed fiber optic circuit prepared in accordance with the method illustrated in FIGS. 13-20, wherein the portion includes a plurality of fibers in a predetermined arrangement supported by a layer of PET foil.

FIGS. 23-24 specifically illustrate the formation of the bare stranded fiber portion 124, also referred to as the fourth portion 116 of the preformed fiber optic circuit 100. The stranded fiber portion 124 starts out with fibers 102 that are routed onto the substrate 128 and are held in place by the top adhesive layer 142 and the second adhesive layer 136. However, unlike the first and third portions 110, 114 of the optical circuit 100, the silicone coating 146 that is shown in the step illustrated in FIG. 18 is not applied. FIG. 23, thus, illustrates the bare fiber 102 with the top PET foil layer 140 (along with the top adhesive layer 142 and the silicone layer 138 at the bottom of the top PET layer 140) that has been removed or peeled from the carrier 126. And, FIG. 24 illustrates the removal of the bare fiber 102 from the adhesive 142 holding the fiber 102 to the top PET foil layer 140 to form the stranded fiber portion 124 of the preformed optical circuit 100.

It should be noted that the process described herein allows the stranded fibers 102 that had been routed in a predetermined configuration on the substrate 128 to maintain their initial configuration, including any fibers 102 that are crossed-over as they extend from one end of the circuit to the opposite end (as shown in the circuits 100, 200 of FIGS. 7-12).

Figure 25:
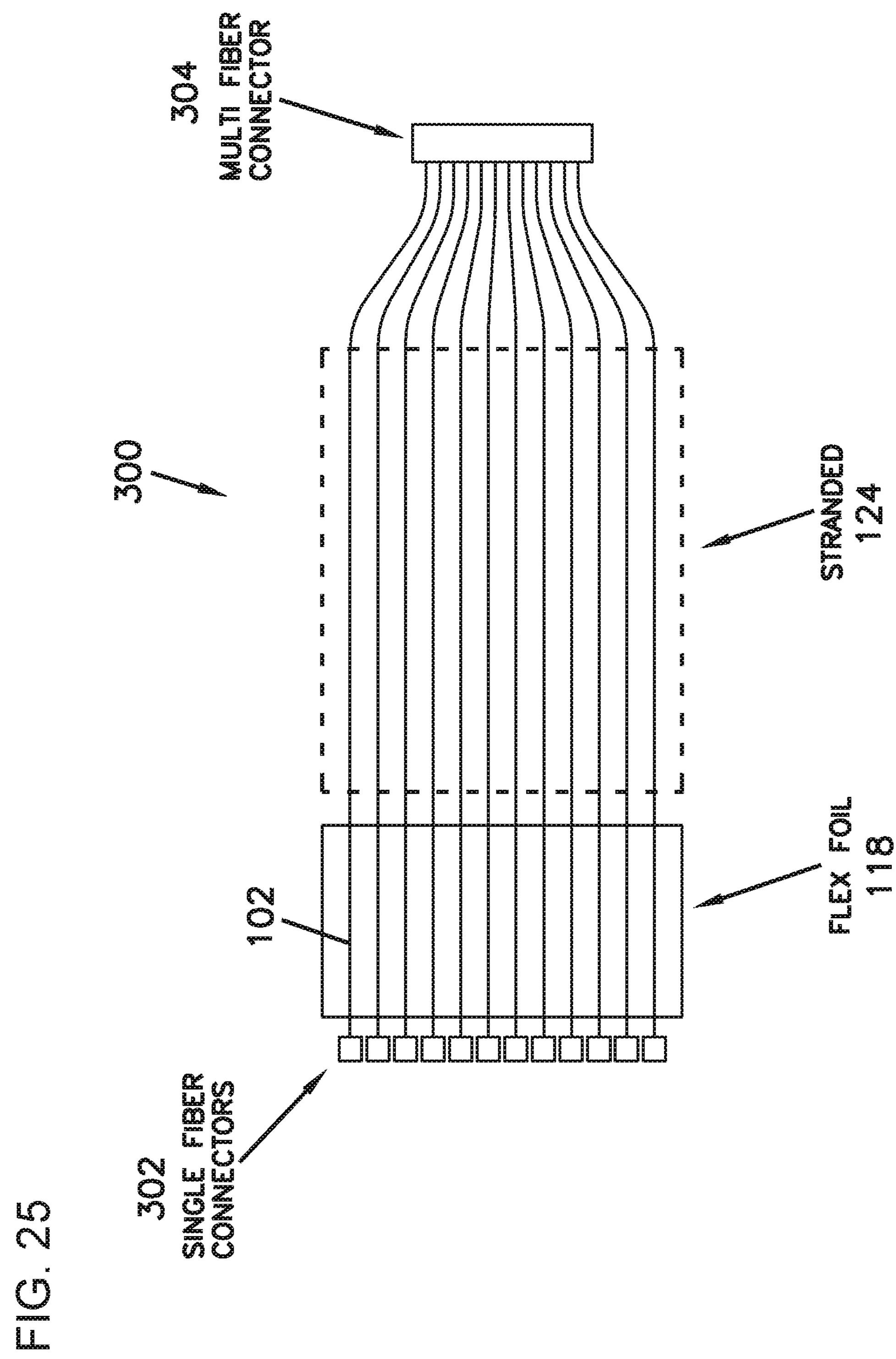
FIG. 25 illustrates a hybrid type fiber optic circuit prepared in accordance with the method illustrated in FIGS. 13-20, wherein first ends of the fibers of the circuit are terminated to simplex fiber optic connectors and second ends of the fibers of the circuit are terminated to a multi-fiber connector, wherein the portion of the fiber optic circuit adjacent the simplex fiber optic connectors includes a plurality of fibers in a predetermined arrangement supported a layer of PET foil and coated by a silicone coating, and wherein the portion of the fiber optic circuit adjacent the multi-fiber connector includes a plurality of uncoated bare stranded fibers in a predetermined arrangement.

Now referring to FIG. 25, illustrated therein is a hybrid type fiber optic circuit 300 prepared in accordance with the methods of FIGS. 13-20, wherein the hybrid circuit 300 includes both a flex foil portion 118 and a stranded fiber portion 124, wherein the flex foil portion 118 is not necessarily used for identification purposes, but is used to fix the fibers 102 in the predetermined orientation.

In the illustrated fully terminated fiber optic circuit 300, the first ends of the fibers 102 of the circuit 300 are terminated to simplex fiber optic connectors 302 (e.g., LC connectors) and second ends of the fibers 102 of the circuit are terminated to a multi-fiber connector 304. The portion 118 of the hybrid fiber optic circuit 300 adjacent the simplex fiber optic connectors 302 includes a plurality of fibers 102 in a predetermined arrangement supported by a flex foil (e.g., a layer of PET foil 140 and coated by a silicone coating 146), and the portion 124 of the fiber optic circuit 300 adjacent the multi-fiber connector 304 includes a plurality of uncoated bare stranded fibers 102 in a predetermined arrangement. Such a hybrid fiber optic circuit may provide the precision needed at the first end of the circuit 300 with the flex foil, where the fibers are individually terminated to the simplex fiber optic connectors 302 and may provide some flexibility at the second end of the circuit 300, where the bare fibers may have to be manipulated or re-worked in terminating to the multi-fiber connector 304.

Having described the preferred aspects and embodiments of the present disclosure, modifications and equivalents of the disclosed concepts may readily occur to one skilled in the art. However, it is intended that such modifications and equivalents be included within the scope of the claims which are appended hereto. And, although in the foregoing description, terms such as "top," "bottom," "front," "back," "right," "left," "upper," and "lower" may have been used for ease of description and illustration, no restriction is intended by such use of the terms. The telecommunications devices described herein can be used in any orientation, depending upon the desired application.

The invention claimed is:

1. A method of preparing a fiber optic circuit, the method comprising:

providing a substrate for supporting a plurality of optical fibers, the substrate including at least one layer of flexible foil formed from polyethylene terephthalate (PET);

peeling the at least one layer of flexible foil formed from PET from the plurality of optical fibers, wherein the plurality of optical fibers separated from the flexible foil formed from PET includes at least a portion coated with a coating including silicone; and terminating one end of the optical fibers to a multi-fiber connector.

2. A method according to claim 1, wherein the plurality of optical fibers separated from the flexible foil formed from PET includes at least a portion of only bare optical fibers that are not coated with a coating that includes silicone.

3. A method according to claim 1, further comprising placing the multi-fiber connector within a telecommunications cassette.

4. A method according to claim 1, wherein the at least one layer of flexible foil formed from PET is peeled from the plurality of optical fibers after one end of the optical fibers is terminated to a multi-fiber connector.

5. A method according to claim 1, further comprising providing indicia on the fiber optic circuit for orienting the optical fibers in a correct orientation prior to termination to the multi-fiber connector.

6. A method according to claim 5, wherein the indicia provided on the fiber optic circuit is also configured to visually indicate the multi-fiber connector to which the optical fibers are to be terminated.

* * * * *